US012634552B2

(12) United States Patent
Hwang et al.

(10) Patent No.: US 12,634,552 B2
(45) Date of Patent: May 19, 2026

(54) DISPLAY DEVICE AND OPERATING METHOD THEREOF

(71) Applicant: LG ELECTRONICS INC., Seoul (KR)

(72) Inventors: Sung Phil Hwang, Seoul (KR); Kang Wook Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 12 days.

(21) Appl. No.: 18/409,563

(22) Filed: Jan. 10, 2024

(65) Prior Publication Data

US 2024/0364962 A1      Oct. 31, 2024

(30) Foreign Application Priority Data

Apr. 26, 2023      (KR) ......................... 10-2023-0054651

(51) Int. Cl.
| | |
|---|---|
| *H04N 21/439* | (2011.01) |
| *H04N 5/64* | (2006.01) |
| *H04N 5/655* | (2006.01) |
| *H04N 21/41* | (2011.01) |

(Continued)

(52) U.S. Cl.
CPC ........... *H04N 21/439* (2013.01); *H04N 5/642* (2013.01); *H04N 5/655* (2013.01);

(Continued)

(58) Field of Classification Search
CPC ...... H04N 21/439; H04N 5/642; H04N 5/655; H04N 21/4104; H04N 21/422; H04N 5/60; H04N 5/607; H04N 5/64; H04N 21/41; H04N 21/42202; H04R 1/028; H04R 1/403; H04R 3/04; H04R 3/12; H04R 2499/15;

(Continued)

(56) References Cited

U.S. PATENT DOCUMENTS

| | | | |
|---|---|---|---|
| 7,027,297 B1 | 4/2006 | Mizuno et al. | |
| 11,748,056 B2 * | 9/2023 | Berliner ................ | G06F 3/0231 |
| | | | 345/156 |

(Continued)

FOREIGN PATENT DOCUMENTS

| | | | |
|---|---|---|---|
| JP | 2001-136600 A | 5/2001 | |
| JP | 2012-235426 A | 11/2012 | |

(Continued)

*Primary Examiner* — Nathan J Flynn
*Assistant Examiner* — Christine A Kurien
(74) *Attorney, Agent, or Firm* — Birch, Stewart, Kolasch & Birch, LLP

(57)      ABSTRACT

A display device including at least one speaker; a moveable display configured to be moved from a first position to a second position, wherein the display has a first spatial physical relationship with the at least one speaker at the first position and has a second spatial physical relationship with the at least one speaker at the second position; and a processor configured to control the at least one speaker and the display. In addition, the processor is configured to output audio from the at least one speaker, when the display is in the first position, and when receiving an information signal indicating the display has been moved to the second position from the first position, change the output of the audio from the at least one speaker based on the second spatial physical relationship.

18 Claims, 30 Drawing Sheets

(51) Int. Cl.

| | |
|---|---|
| *H04R 1/02* | (2006.01) |
| *H04R 1/40* | (2006.01) |
| *H04R 3/04* | (2006.01) |
| *H04R 3/12* | (2006.01) |

(52) U.S. Cl.
CPC ......... *H04N 21/4104* (2013.01); *H04R 1/028* (2013.01); *H04R 1/403* (2013.01); *H04R 3/04* (2013.01); *H04R 3/12* (2013.01); *H04R 2499/15* (2013.01)

(58) Field of Classification Search
CPC .... G06F 1/1601; G06F 1/1605; G06F 1/1628; G06F 1/1637; G06F 1/1688; G06F 1/1694; G06F 3/165; G06F 3/14
See application file for complete search history.

(56) References Cited

U.S. PATENT DOCUMENTS

| | | | |
|---|---|---|---|
| 2007/0273790 A1 | 11/2007 | Sakata et al. | |
| 2008/0016650 A1 | 1/2008 | Moon et al. | |
| 2011/0092294 A1 | 4/2011 | Mercier | |
| 2019/0107867 A1 | 4/2019 | Chiang et al. | |
| 2021/0382672 A1* | 12/2021 | Back ....................... | H04R 5/02 |
| 2021/0389923 A1 | 12/2021 | Hwang | |

FOREIGN PATENT DOCUMENTS

| | | | |
|---|---|---|---|
| JP | 6758455 | B1 | 9/2020 |
| KR | 10-0775379 | B1 | 11/2007 |
| KR | 10-2009-0002866 | A | 1/2009 |

* cited by examiner (c)

(b)

(a)

(a)

(b)

(a)

(b)

(a)

(b)

(a)

(b)

(a)                                    (b)

(a)

(b)

DISPLAY DEVICE AND OPERATING METHOD THEREOF

CROSS-REFERENCE TO RELATED APPLICATIONS

This application claims priority under 35 U.S.C. § 119(a) to Korean Patent Application No. 10-2023-0054651, filed in the Republic of Korea on Apr. 26, 2023, the entire contents of which is hereby expressly incorporated by reference into the present application.

BACKGROUND

Field of the Invention

The present disclosure relates to a display device and operating method thereof.

Discussion of the Related Art

A display device receives, processes and displays a viewable image. For example, the display device can receive a broadcast signal selected by the user among broadcast signals transmitted from a broadcasting station, separate an image signal from the received signal, and display the separated image signal on a display.

Recently, display devices using a dual tuner are increasing. One of the dual tuners is set to output a video and the other is set to record a video. In particular, a tuner and a demodulator for video output are fixed in advance. Therefore, when a threshold sensitivity for detecting a signal is high, a noisy signal can be mistakenly recognized as a signal, and when the sensitivity is lowered, a sufficient signal can be mistakenly recognized as noise.

SUMMARY

Accordingly, an object of the present invention is to address the above-noted and other problems.

Another object of the present disclosure is to provide a display device controlling an output of an audio based on an operational mode of a display.

To achieve these and other advantages and in accordance with the purpose of the disclosure, as embodied and broadly described herein, the present disclosure provides in one aspect a display device including at least one speaker; a display; and a processor configured to control the at least one speaker and the display. The processor controls the output of the at least one speaker based on relationship information between the at least one speaker and the display, where the relationship information is acquired by a physical relationship between the display and the at least one speaker, when the display is moved at an arbitrary position by a movement mechanism connected to one end of the display.

In another aspect, the present disclosure provides a display device including a first case including at least one speaker; and a second case including a display with a sensor. Further, the first case is opened and tilted at a predetermined angle, when the first case is disengaged from the second case. Also, the second case includes a movement mechanism to support the movement of the display to any arbitrary position. The movement mechanism includes a foldable stand supporting vertical, horizontal, and rotational movements of the display, and is mounted on the second case with grooves and one side of the display. In addition, at least one of the first case and the second case includes a processor configured to control an output of the at least one speaker according to a state of the display.

According to at least one of various embodiments in this disclosure, the display device enables the user to enjoy content while minimizing viewing interference by adaptively controlling the output of an audio output device depending on the operational mode of the display. Further, the user satisfaction with the display device is increased.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

The display device according to an embodiment of the present disclosure includes, for example, an intelligent display device in which a computer support function is added to a broadcast reception function, and includes a broadcast reception function and an Internet function added thereto, such as a handwritten input device, a touch screen, etc. A user-friendly interface such as a spatial remote control can also be provided. In addition, the display device can be connected to the Internet and a computer via a wired or wireless Internet function, and functions such as e-mail, web browsing, banking, or games can also be performed. A general-purpose OS can be used to provide these various functions.

Accordingly, in the display device described in the present disclosure, various user-friendly functions can be performed because applications can be freely added or deleted, for example, on a general-purpose OS kernel. More specifically, the display device can be, for example, a network TV, HBBTV, smart TV, LED TV, OLED TV, and the like, and can be applied to a smart phone.

Hereinafter, the display device according to the embodiment of the present disclosure will be described. In particular, FIG. 1 is a block diagram illustrating a configuration of a display device according to an embodiment of the present disclosure.

Figure 1:
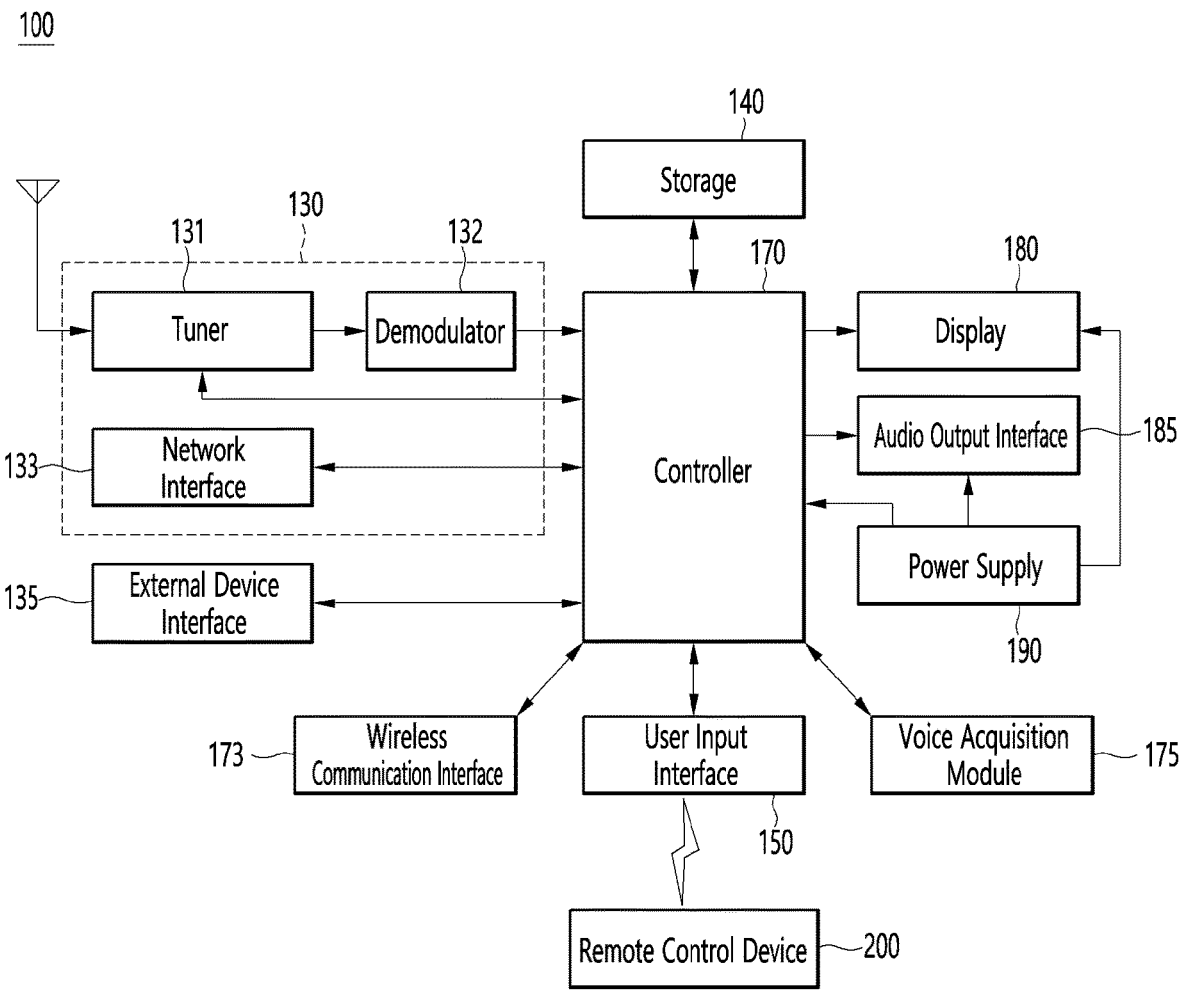
FIG. 1 is a block diagram illustrating a configuration of a display device according to an embodiment of the present disclosure.

Referring to FIG. 1, a display device 100 can include a broadcast receiver 130, an external device interface 135, a memory 140, a user input interface 150, a controller 170, a wireless communication interface 173, a display 180, a speaker 185, and a power supply circuit 190. The broadcast receiver 130 can include a tuner 131, a demodulator 132, and a network interface 133. Further, the tuner 131 can select a specific broadcast channel according to a channel selection command and can receive a broadcast signal for the selected specific broadcast channel.

The demodulator 132 can separate the received broadcast signal into an image signal, an audio signal, and a data signal related to a broadcast program, and restore the separated image signal, audio signal, and data signal to a format capable of being output. Further, the external device interface 135 can receive an application or a list of applications in an external device adjacent thereto, and transmit the same to the controller 170 or the memory 140.

The external device interface 135 can also provide a connection path between the display device 100 and an external device. Thus, the external device interface 135 can receive one or more of images and audio output from an external device connected to the display device 100 in a wired or wireless manner, and transmit the same to the controller 170. The external device interface 135 can also include a plurality of external input terminals including an RGB terminal, one or more High-Definition Multimedia Interface (HDMI) terminals, and a component terminal, for example.

In addition, the image signal of the external device input through the external device interface 135 can be output through the display 180. Also, the audio signal of the external device input through the external device interface 135 can be output through the speaker 185. The external device connectable to the external device interface 135 can be any one of a set-top box, a Blu-ray player, a DVD player, a game machine, a sound bar, a smartphone, a PC, a USB memory, and a home theater, but this is only an example.

The network interface 133 provides an interface for connecting the display device 100 to a wired/wireless network including an Internet network. The network interface 133 can transmit or receive data to or from other users or other electronic devices through a connected network or another network linked to the connected network. In addition, a part of content data stored in the display device 100 can be transmitted to a selected user or a selected electronic device among other users or other electronic devices registered in advance in the display device 100.

Further, the network interface 133 can access a predetermined web page through the connected network or the other network linked to the connected network. That is, to the display device can access a predetermined web page through a network, and transmit or receive data to or from a corresponding server. In addition, the network interface 133 can receive content or data provided by a content provider or a network operator. That is, the network interface 133 can receive content such as movies, advertisements, games, VOD, and broadcast signals and information related thereto provided from a content provider or a network provider through a network.

In addition, the network interface 133 can receive update information and update files of firmware provided by the network operator, and can transmit data to an Internet or a content provider or a network operator. The network interface 133 can also select and receive a desired application from among applications that are open to the public through a network.

Further, the memory 140 can store programs for signal processing and control of the controller 170, and can store images, audio, or data signals, which have been subjected to signal-processing. In addition, the memory 140 can perform a function for temporarily storing images, audio, or data signals input from an external device interface 135 or the network interface 133, and store information on a predetermined image through a channel storage function. The memory 140 can also store an application or a list of applications input from the external device interface 135 or the network interface 133.

The display device 100 can also play back a content file (a moving image file, a still image file, a music file, a document file, an application file, or the like) stored in the memory 140 and provide the same to the user. Further, the user input interface 150 can transmit a signal input by the user to the controller 170 or a signal from the controller 170 to the user. For example, the user input interface 150 can receive and process a control signal such as power on/off, channel selection, screen settings, and the like from the remote control device 200 in accordance with various communication methods, such as a Bluetooth communication method, a UWB (Ultra Wideband) communication method, a ZigBee communication method, an RF (Radio Frequency) communication method, or an infrared (IR) communication method or can perform processing to transmit the control signal from the controller 170 to the remote control device 200.

In addition, the user input interface 150 can transmit a control signal input from a local key such as a power key, a channel key, a volume key, and a setting value to the controller 170. The image signal image-processed by the controller 170 can be input to the display 180 and displayed as an image corresponding to a corresponding image signal.

Also, the image signal image-processed by the controller 170 can be input to an external output device through the external device interface 135.

The audio signal processed by the controller 170 can be output to the speaker 185. Also, the audio signal processed by the controller 170 can be input to the external output device through the external device interface 135. Further, the audio signal processed by the controller 170 can be input to the external output device through the external device interface 135.

In addition, the controller 170 can control the display device 100 by a user command input through the user input interface 150 or an internal program and connect to a network to download an application a list of applications or applications desired by the user to the display device 100. The controller 170 controls the channel information or the like selected by the user to be output through the display 180 or the speaker 185 along with the processed image or audio signal. In addition, the controller 170 can output an image signal or an audio signal through the display 180 or the speaker 185, according to a command for playing back an image of an external device through the user input interface 150, the image signal or the audio signal being input from an external device, for example, a camera or a camcorder, through the external device interface 135.

Also, the controller 170 can control the display 180 to display an image, for example, control a broadcast image input through the tuner 131 or an external input image input through the external device interface 135, an image input through the network interface or an image stored in the memory 140 to be displayed on the display 180. In this instance, an image being displayed on the display 180 can be a still image or a moving image, and can be a 2D image or a 3D image.

In addition, the controller 170 can control content stored in the display device 100, received broadcast content, or external input content input from the outside to be played back, and the content can have various forms such as a broadcast image, an external input image, an audio file, still images, accessed web screens, and document files.

Further, the wireless communication interface 173 can communicate with an external device through wired or wireless communication. For example, the wireless communication interface 173 can perform short range communication with an external device. Also, the wireless communication interface 173 can support short range communication using at least one of Bluetooth™, Radio Frequency Identification (RFID), Infrared Data Association (IrDA), UWB, ZigBee, Near Field Communication (NFC), Wi-Fi (Wireless-Fidelity), Wi-Fi Direct, and Wireless Universal Serial Bus (USB) technologies. The wireless communication interface 173 can also support wireless communication between the display device 100 and a wireless communication system, between the display device 100 and another display device 100, or between the display device 100 and a network in which the display device 100 (or an external server) is located through wireless area networks. The wireless area networks can be wireless personal area networks, for example.

Here, the other display device 100 can be a wearable device (e.g., a smartwatch, smart glasses or a head mounted display (HMD)), a mobile terminal such as a smart phone, which is able to exchange data (or interwork) with the display device 100 according to the present disclosure. The wireless communication interface 173 can also detect (or recognize) a wearable device capable of communication around the display device 100.

Furthermore, when the detected wearable device is an authenticated device to communicate with the display device 100 according to the present disclosure, the controller 170 can transmit at least a portion of data processed by the display device 100 to the wearable device through the wireless communication interface 173. Therefore, a user of the wearable device can use data processed by the display device 100 through the wearable device.

The display 180 can also convert image signals, data signals, and OSD signals processed by the controller 170, or image signals or data signals received from the external device interface 135 into R, G, and B signals, and generate drive signals. Also, the display device 100 shown in FIG. 1 is only an embodiment of the present disclosure, and some of the illustrated components can be integrated, added, or omitted depending on the specification of the display device 100 that is actually implemented. In more detail, two or more components can be combined into one component, or one component can be divided into two or more components.

According to another embodiment of the present disclosure, unlike the display device 100 shown in FIG. 1, the display device 100 can receive an image through the network interface 133 or the external device interface 135 without a tuner 131 and a demodulator 132 and play back the same. For example, the display device 100 can be divided into an image processing device, such as a set-top box, for receiving broadcast signals or content according to various network services, and a content playback device that plays back content input from the image processing device. In this instance, an operation method of the display device according to an embodiment of the present disclosure will be described below can be implemented by not only the display device 100 as described with reference to FIG. 1 but also one of an image processing device such as the separated set-top box and a content playback device including the display 180 and the speaker 185.

Next, a remote control device according to an embodiment of the present disclosure will be described with reference to FIGS. 2 and 3. In particular, FIG. 2 is a block diagram of a remote control device 200 and FIG. 3 illustrates an actual configuration example of the remote control device 200 according to an embodiment of the present disclosure.

Figure 2:
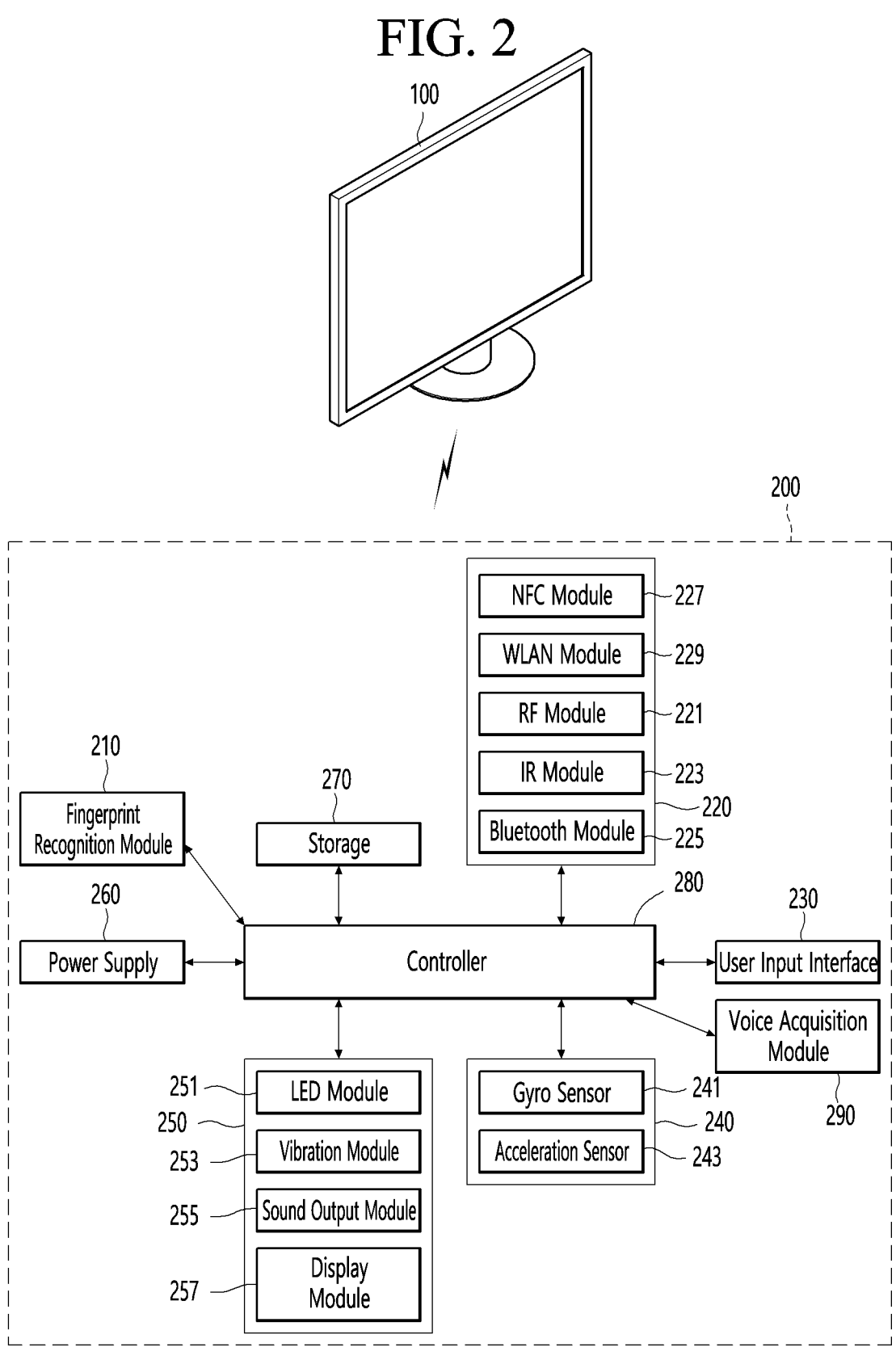
FIG. 2 is a block diagram illustrating a remote control device according to an embodiment of the present disclosure.
Figure 3:
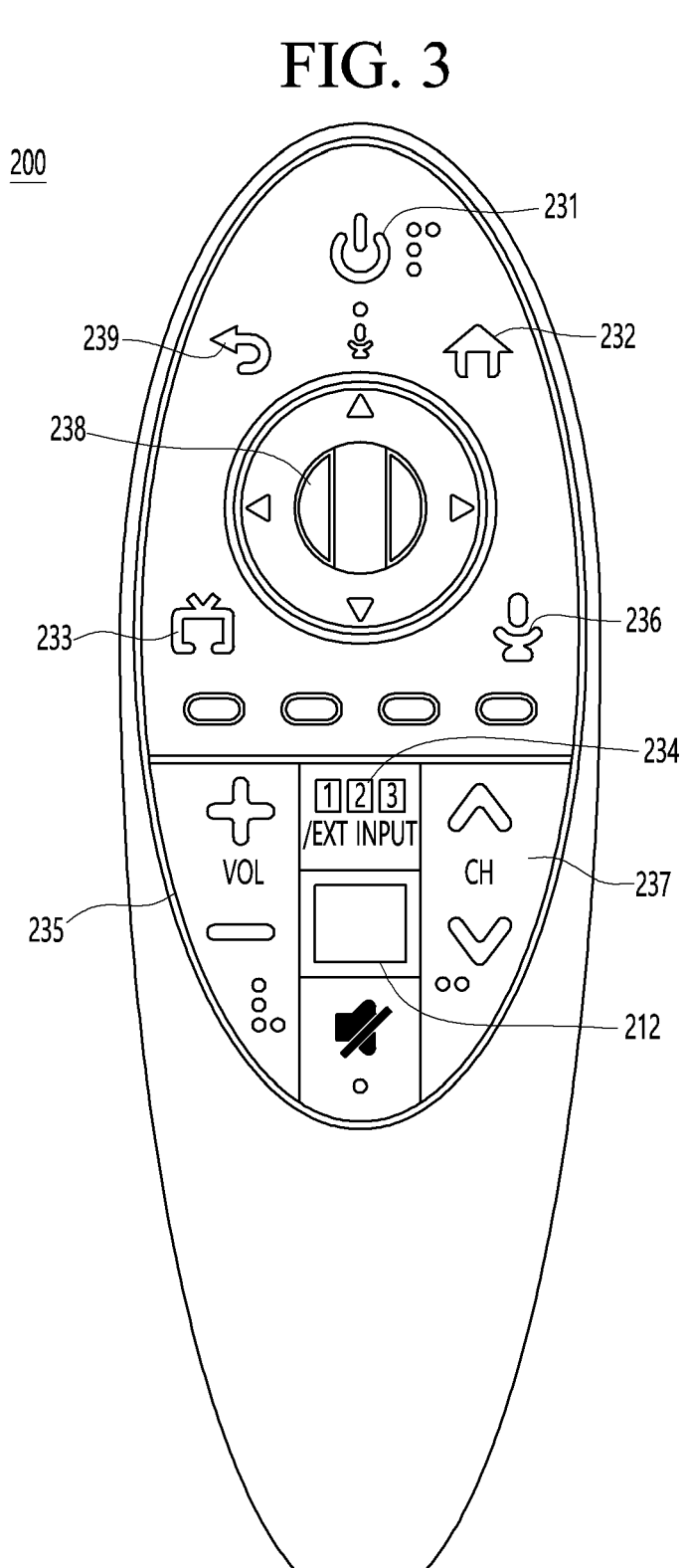
FIG. 3 is an overview of a remote control device according to an embodiment of the present disclosure.

First, referring to FIG. 2, the remote control device 200 can include a fingerprint reader 210, a wireless communication circuit 220, a user input interface 230, a sensor 240, an output interface 250, a power supply circuit 260, a memory 270, a controller 280, and a microphone 290. As shown in FIG. 2, the wireless communication circuit 220 can transmit and receive signals to and from any one of display devices according to embodiments of the present disclosure.

The remote control device 200 can include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 can include a Bluetooth circuit 225 capable of transmitting and receiving signals to and from the display device 100 according to the Bluetooth communication standard. Also, the remote control device 200 can include an NFC circuit 227 capable of transmitting and receiving signals to and from the display device 100 according to the NFC communication standard, and a WLAN circuit 229 capable of transmitting and receiving signals to and from the display device 100 according to the WLAN communication standard.

In addition, the remote control device 200 can transmit a signal containing information on the movement of the remote control device 200 to the display device 100 through the wireless communication circuit 220. Further, the remote control device 200 can receive a signal transmitted by the display device 100 through the RF circuit 221, and transmit a command regarding power on/off, channel change, volume adjustment, or the like to the display device 100 through the IR circuit 223 as necessary.

The user input interface 230 can include a keypad, a button, a touch pad, a touch screen, or the like. The user can therefore input a command related to the display device 100 to the remote control device 200 by operating the user input interface 230. When the user input interface 230 includes a hard key button, the user can input a command related to the display device 100 to the remote control device 200 through a push operation of the hard key button.

Referring to FIG. 3, the remote control device 200 can include a plurality of buttons including a fingerprint recognition button 212, a power button 231, a home button 232, a live button 233, an external input button 234, a volume control button 235, a voice recognition button 236, a channel change button 237, an OK button 238, and a back-play button 239. The fingerprint recognition button 212 is used to recognize a user's fingerprint. In one embodiment, the fingerprint recognition button 212 can enable a push operation, and thus can receive a push operation and a fingerprint recognition operation. Also, the power button 231 is used for turning on/off the power of the display device 100.

The home button 232 can be used to move to the home screen of the display device 100 and the live button 233 can be used for displaying a real-time broadcast program. Also, the external input button 234 can be used for receiving an external input connected to the display device 100 and the volume control button 235 can be used for adjusting the level of the volume output by the display device 100.

The voice recognition button 236 can be used for receiving a user's voice and recognizing the received voice. The channel change button 237 can be used for receiving a broadcast signal of a specific broadcast channel. The OK button 238 can be used for selecting a specific function, and the back-play button 239 can be used for returning to a previous screen.

A description will be given referring again to FIG. 2. When the user input interface 230 includes a touch screen, the user can input a command related to the display device 100 to the remote control device 200 by touching a soft key of the touch screen. In addition, the user input interface 230 can include various types of input mechanisms that can be operated by a user, such as a scroll key or a jog key, and the present embodiment does not limit the scope of the present disclosure.

Further, the sensor 240 can include a gyro sensor 241 or an acceleration sensor 243, and the gyro sensor 241 can sense information regarding the movement of the remote control device 200. For example, the gyro sensor 241 can sense information about the operation of the remote control device 200 based on the x, y, and z axes, and the acceleration sensor 243 can sense information about the moving speed of the remote control device 200. Meanwhile, the remote control device 200 can further include a distance measuring sensor to sense the distance between the display device 100 and the display 180.

The output interface 250 can output an image or audio signal corresponding to the operation of the user input interface 230 or a signal transmitted from the display device 100. Also, the user can recognize whether the user input interface 230 is operated or whether the display device 100 is controlled through the output interface 250. For example, the output interface 450 can include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication unit 225.

In addition, the power supply circuit 260 can supply power to the remote control device 200, and stop power supply when the remote control device 200 has not moved for a predetermined time to reduce power consumption. The power supply circuit 260 can also restart power supply when a predetermined key provided in the remote control device 200 is operated. Also, the memory 270 can store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band. The controller 280 of the remote control device 200 can store and refer to information on a frequency band capable of wirelessly transmitting and receiving signals to and from the display device 100 paired with the remote control device 200 in the memory 270.

Further, the controller 280 can control all matters related to the control of the remote control device 200. For example, the controller 280 can transmit a signal corresponding to a predetermined key operation of the user input interface 230 or a signal corresponding to the movement of the remote control device 200 sensed by the sensor 240 through the wireless communication unit 225. Also, the microphone 290 of the remote control device 200 can obtain speech. A plurality of microphones 290 can also be provided.

Figure 4:
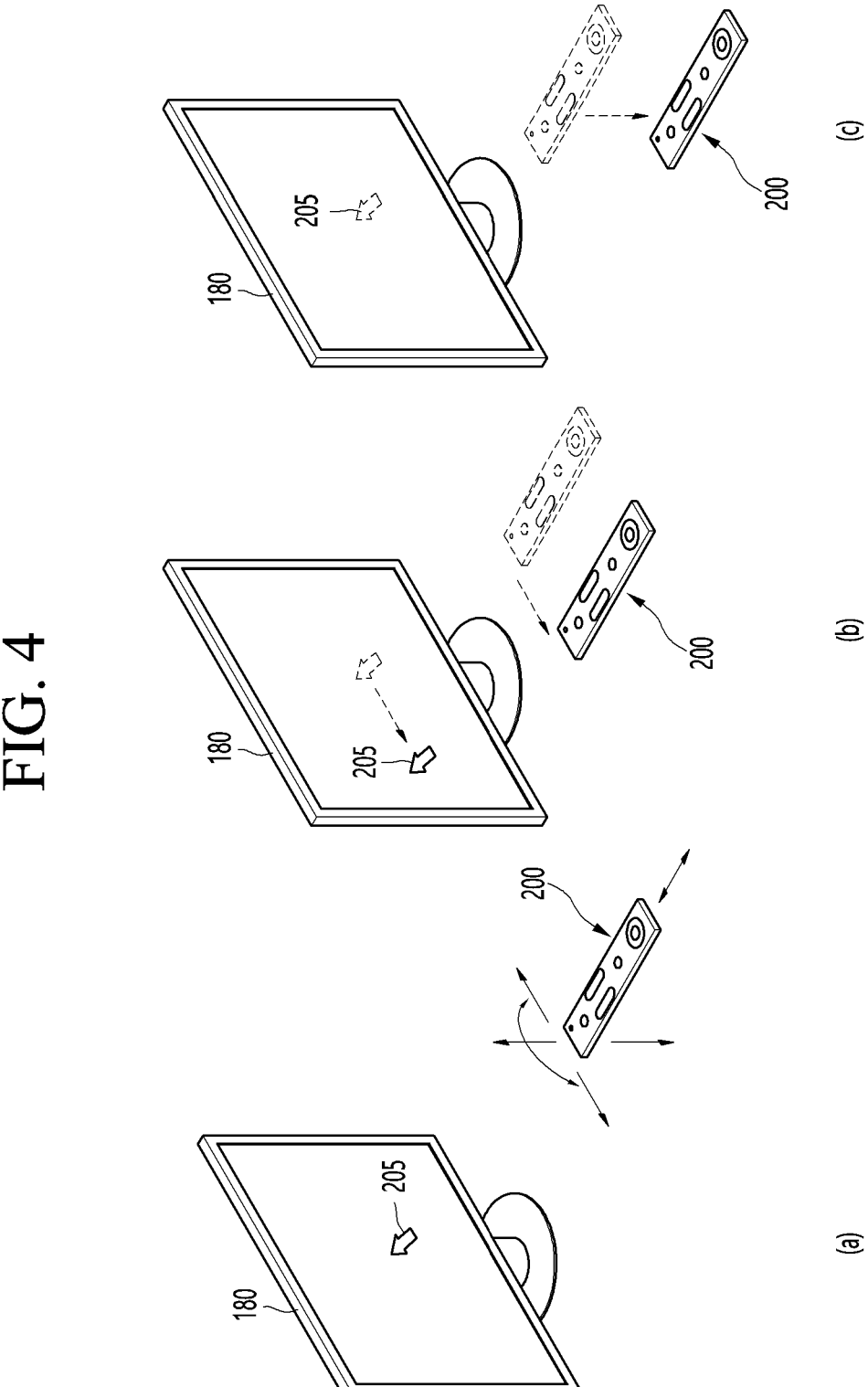
FIG. 4 includes overviews illustrating an example of using a remote control device according to an embodiment of the present disclosure.

Next, FIG. 4 is an overview of an example of using a remote control device according to an embodiment of the present disclosure. In particular FIG. 4(*a*) illustrates that a pointer 205 corresponding to the remote control device 200 is displayed on the display 180.

As shown, the user can move or rotate the remote control device 200 up, down, left and right. The pointer 205 displayed on the display 180 of the display device 100 then moves according to the movement of the remote control device 200. As shown in the drawings, the pointer 205 is moved and displayed according to movement of the remote control device 200 in a 3D space, so the remote control device 200 can be called a space remote control device.

In addition, FIG. 4(*b*) illustrates that when the user moves the remote control device 200 to the left, the pointer 205 displayed on the display 180 of the display device 100 moves to the left correspondingly. Information on the movement of the remote control device 200 detected through a sensor of the remote control device 200 is transmitted to the display device 100. The display device 100 can calculate the coordinates of the pointer 205 based on information on the movement of the remote control device 200. The display device 100 can also display the pointer 205 to correspond to the calculated coordinates.

Further, FIG. 4(*c*) illustrates that a user moves the remote control device 200 away from the display 180 while pressing a specific button in the remote control device 200. Accordingly, a selected area in the display 180 corresponding to the pointer 205 can be zoomed in and displayed enlarged. Conversely, when the user moves the remote control device 200 closer to the display 180, the selected area in the display 180 corresponding to the pointer 205 can be zoomed out and displayed reduced.

When the remote control device 200 moves away from the display 180, the selected area can be zoomed out, and when the remote control device 200 moves to be close to the display 180, the selected area can be zoomed in. Also, when a specific button in the remote control device 200 is being pressed, recognition of up, down, left, or right movements can be excluded. That is, when the remote control device 200 moves away from or close to the display 180, the up, down, left, or right movements are not recognized, and only the forward and backward movements can be recognized. When a specific button in the remote control device 200 is not being pressed, only the pointer 205 moves according to the up, down, left, or right movements of the remote control device 200.

Meanwhile, the movement speed or the movement direction of the pointer 205 can correspond to the movement speed or the movement direction of the remote control device 200. Also, in the present specification, a pointer refers to an object displayed on the display 180 in response to an operation of the remote control device 200. Accordingly, objects of various shapes other than the arrow shape shown in the drawings are possible as the pointer 205. For example, the object can be a concept including a dot, a cursor, a prompt, a thick outline, and the like. In addition, the pointer 205 can be displayed corresponding to any one point among points on a horizontal axis and a vertical axis on the display 180, and can also be displayed corresponding to a plurality of points such as a line and a surface. The display device 100 can be implemented in a box (or a briefcase) shape including a display. However, such a shape is only an example.

Next, the display device 100 will be described referring to FIGS. 5-7. As shown, the display device 100 can be implemented in a box (or a briefcase) shape including a display. However, such a shape is only an example. One embodiment of the display device includes a first case including at least one speaker and a second case including a display with a sensor. The first case can be opened and tilted at a predetermined angle. The second case can include a movement mechanism to support the movement of the display 610 to any arbitrary position. The movement mechanism includes a foldable stand supporting vertical, horizontal, and rotational movements of the display 610, can be mounted on the second case with grooves and one side of the display 610. At least one of the first case and the second case can include a processor configured to control an output of the at least one speaker according to a state of the display 610.

Figure 5:
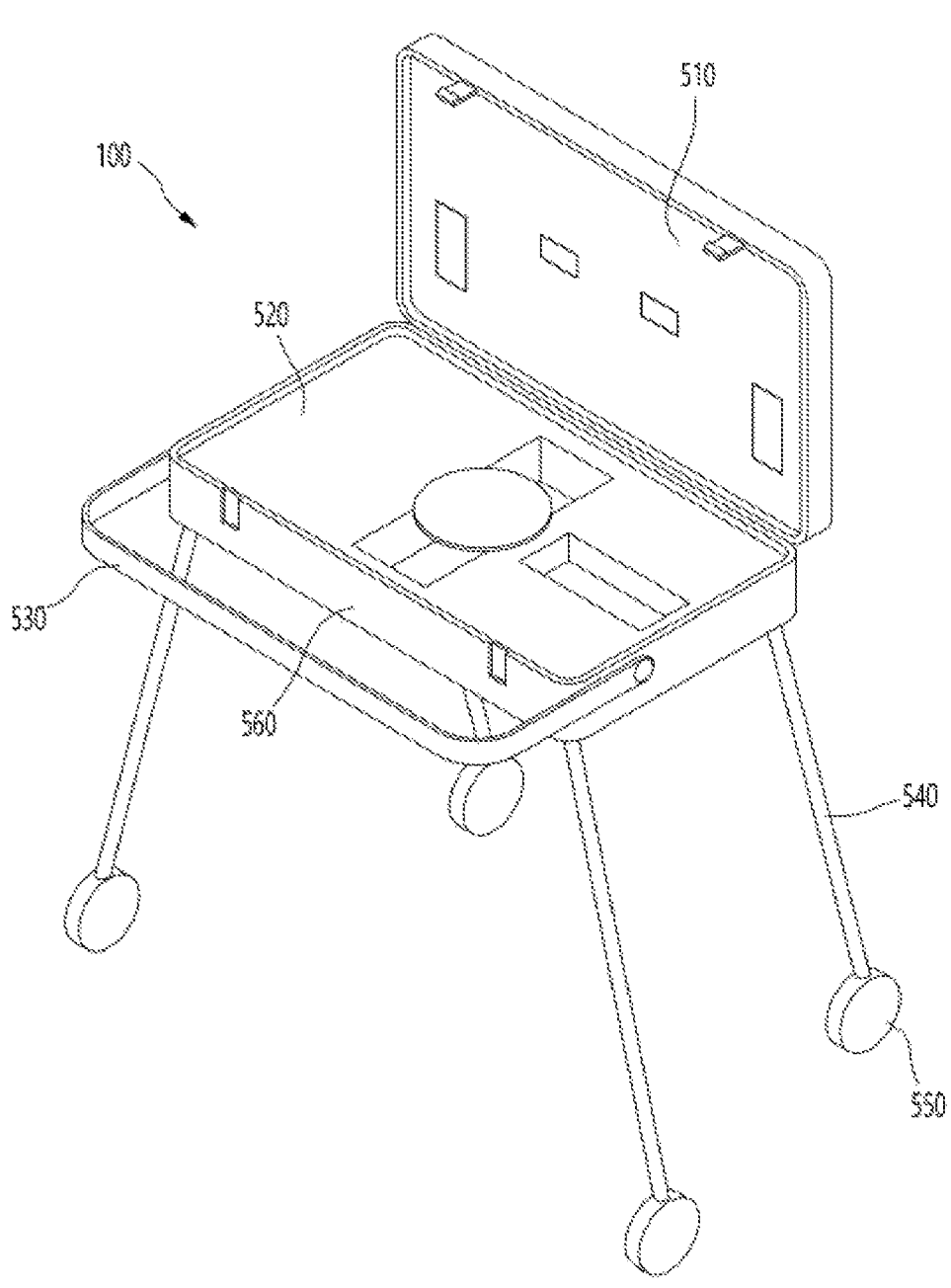
FIG. 5 is a perspective view of the display device 100.

Referring to FIG. 5, the display device 100 can include an upper case 510 and a lower case 520. In this disclosure, the meaning of the term "case" includes a box and a housing, but is not limited thereto. As an example, the upper case can be represented as an upper box or an upper housing. The upper case 510 and the lower case 520 for the display device 100 can also be formed in a retractable structure.

In addition, FIG. 5 illustrates the display device 100 with the open upper case 510. As shown, one end of the upper case 510 and one end of the lower case 520 corresponding thereto are coupled to each other through a first coupling mechanism. The first coupling mechanism can include, for example, a hinge, but is not limited thereto.

Further, the other end of the upper case 510 and the other end of the lower case 520 corresponding thereto can be coupled and separated from each other through the second coupling mechanism. Unlike the first coupling mechanism, the second coupling mechanism can include a configuration in which coupling is capable of being released due to a weakening coupling force when pressure is applied. For example, when pressure is applied to the second coupling mechanism, the upper case 510 is capable of being automatically opened as shown in FIG. 5. During the opening of the upper case 510, an opening speed of the upper case 510 can be controlled by using a step motor or servo motor with the first coupling mechanism.

In addition, second coupling mechanism can be implemented through, for example, a latch-locking groove combination. The locking member can be formed in the upper case 510, and the locking groove can be formed in the lower case 520. Therefore, the upper case 510 and the lower case 520 are coupled by inserting the locking member into the locking groove, and when pressure is applied to the locking groove open portion which can be formed on the outer 560 of the lower case 520, the latch inserted into the locking groove can be separated from the locking groove. However, the second coupling mechanism is not limited to a combination of the latch-locking groove.

Referring to FIG. 5, a plurality of grooves can be formed on the lower surface of the lower case 520, and each rack or leg 540 for supporting the display device 100 can be accommodated in each groove. A caster 550 is coupled to the other end of the rack 540 accommodated in each groove of the lower case 520 so that the display device 100 can be moved and supported. In FIG. 5, four grooves, four racks, and four casters are exemplified, but are not limited thereto. Accordingly, the number of grooves, racks, and casters is not limited in supporting the operation of the display device 100.

In addition, each rack or leg 540 can be detached from and attached to each groove formed on the lower surface of the lower case 520. In addition, each rack 540 can be extended in the longitudinal direction, so that the height of the display device 100 can be adjusted.

Further, the caster 550 includes wheels and can support the display device 100 to be moved in an arbitrary direction. The caster 550 can also include fixing mechanism for restricting the movement of the wheel. The fixing mechanism can support the display device 100 to be fixed at a predetermined position, preventing unintentional movement of the display device 100 while viewing content.

In addition, the upper case 510 and the lower case 520 each have a predetermined thickness, and a strap (or a handle) 530 can be provided on an outer surface of at least one of the upper case 510 or the lower case 520. FIG. 5 illustrates that the strap 530 is formed on the outer surface of the lower case 520, but the strap 530 is not limited to only the lower case 520. The user can move the display device 100 in an arbitrary direction, that is, to the desired position using the strap 530.

Hereinafter, the operation of the display device 100 illustrated in FIG. 5 will be described in more detail. Referring to FIGS. 5 and 6, at least one audio output mechanism such as a speaker can be provided in the upper case 510, while the display 610 can be provided in the lower case 520.

Figure 6:
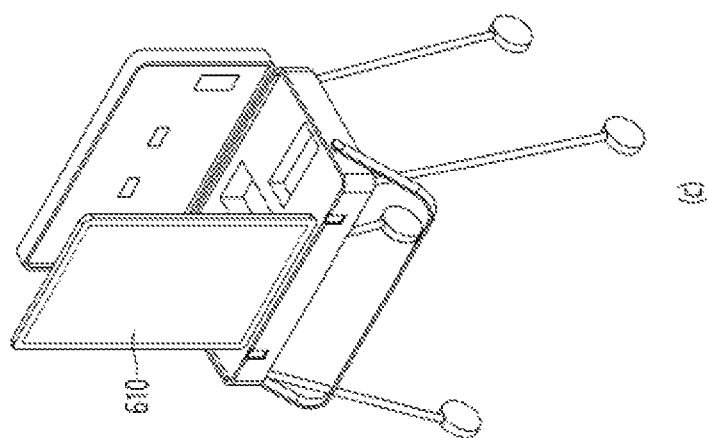
FIG. 6 is a diagram illustrating an appearance of the display device 100 according to a display operational mode.
Figure 6:
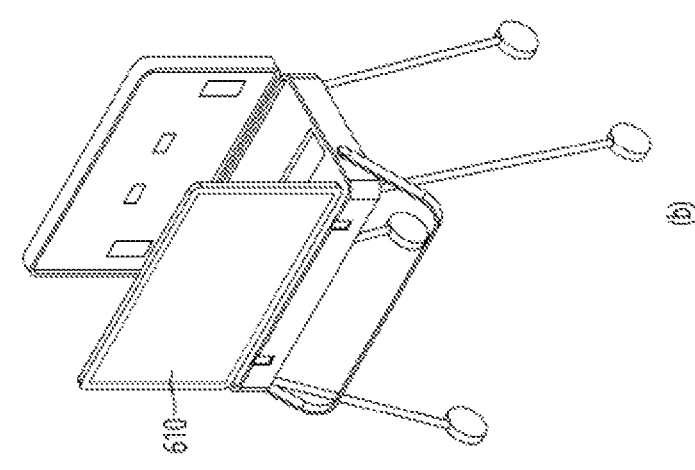
Figure 6:
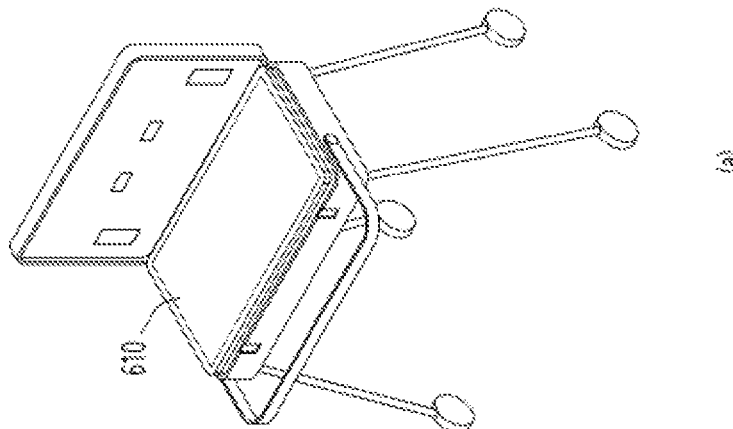

The display 610 shown in FIG. 6 and as described in the present disclosure is generally implemented in a rectangular shape, but is not limited thereto. Also, the term "rectangular shape" can also mean a rectangle is formed as a whole, but each vertex portion is rounded. The display device 100 can include at least one speaker, a display and a processor configured to control the at least one speaker and the display 610. In particular, the processor can be configured to control the output of the at least one speaker based on relationship information between the at least one speaker and the display 610. The relationship information can be acquired by a physical spatial relationship between the display 610 and the at least one speaker, when the display 610 is moved at an arbitrary position by a movement mechanism connected to one end of the display 610.

In addition, the movement mechanism can include a foldable stand including a hinge. The display device 100 can further include at least one sensor configured to sense the position moved by the movement mechanism. The at least one sensor can be mounted on one end of the display 610 or integrated in the display 610.

Further, the physical relationship between the display 610 and the at least one speaker can be defined by an overlap status of the output direction of the at least one speaker with respect to the moved position of the display 610 and a distance between the display 610 and the at least one speaker. Also, the processor can be configured to define the operational mode of the display 610 based on the relationship information related to the physical relationship between the display 610 and at least one speaker.

In addition, the operational mode of the display 610 can include a first operational mode in which the output direction of at least one speaker does not overlap with the display 610, a second operational mode in which the output direction of at least one speaker partially overlaps with the display 610, and a third operational mode in which the output direction of at least one speaker fully overlaps with the display 610. The processor can define the output of at least one speaker in the first operational mode as a reference output and control the output of at least one speaker in the remaining operational modes based on the reference output.

When the display 610 is operated in the second operational mode, the processor can control the output of a first frequency band of the reference output to be reduced and the output of a second frequency band to be increased, based on the reference output of the at least one speaker. When the display 610 is operated in the third operational mode, the processor can control the output of a third frequency band of the reference output to be reduced and the output of a fourth frequency band to be increased, based on the reference output of the at least one speaker.

When the display 610 is operated in the third operational mode, the processor can control the output of a fifth frequency band of at least one speaker's output from the second operational mode to be reduced and the output of the sixth frequency band to be increased. The processor can also control the output of the at least one speaker in accordance with a pre-mapped EQ mode based on the operational mode of the display 610 determined by the relationship information.

When the at least one speaker includes an array so speakers, the processor can control the output direction of the at least one speaker based on the operational mode of the display 610 determined by the relationship information. More specifically, the operational mode of the display device 100 is described as follows.

In the present disclosure, the operational mode can refer to the relationship of between the display 610 and the lower case 520. The operational mode can also refer to the relationship between the display 610 and the upper case 510. The operational mode can also refer to the relationship among the display 610, the upper case 510 and the lower case 520, but this is not limited thereto. The operational mode can be referred to as various terms such as a screen mode, a playback mode, an output mode, a display status and the like.

FIG. 6 illustrates three operational modes of the display devices 100. To explain the operational mode of the display device 100, it can be assumed that the upper case 510 is opened so that the display 610 connected to the lower case 520 can be exposed to the outside. Here, being exposed to the outside can indicate a user can view the content, such as when the content is reproduced on the display.

The upper case 510 can be fixed at a position corresponding to an arbitrary angle relative to the lower case 520 when the upper case 510 is opened. Here, an arbitrary angle can be determined according to settings or a user's selection. The arbitrary angle referred to in this disclosure can represent an angle between the upper case 510 and the lower case 520 (or a reference plane such as a floor plane) ranging from 90 to 270 degrees, but is not limited thereto.

The first operational mode, shown in FIG. 6(a), can refer to when the display 610 is fixed to the lower case 520 (or a state parallel to the lower case 520). Accordingly, in the first operational mode, the display 610 can be parallel to the lower case 520 while the upper case 510 is at an arbitrary angle (e.g., 90 degrees) to the lower case 520. This first operational mode can also be named a turn-table operational mode, a basic or default operational mode, and the like.

Further, for other than the first operational mode, the display 610 can be in a released state, indicating that the display 610 is not fixed to the lower case 520. In addition, modes other than the first operational mode can be referred to as release modes, indicating that the display 610 is not fixed to the lower case 520. These release modes can include the second operational mode shown in FIG. 6(b) and the third operational mode shown in FIG. 6(c).

As shown in FIGS. 6(b) and 6(c), the second and third operational modes can indicate a status in which the display 610 is not fixed to the lower case 520 but is fixed to an arbitrary position. The arbitrary position can be referred as a position where an arbitrary angle is formed between the lower case 520 or the reference plane and the display 610, and the arbitrary angle can range from 1 to 180 degrees, for example.

Alternatively, when the display 610 is positioned in front of the upper case 510, two additional operational modes can be defined based on the relationship such as the degree of overlap between the display 610 and the upper case 510. When the display overlaps with at least a portion of the upper case 510 above a certain predetermined value, this can be referred to as the second operational mode. Conversely, when the overlap is below the predetermined value, it can be referred to as the third operational mode.

In addition, when viewing the display device 100 from the side, in which the display 610 is parallel (or almost parallel) to the upper case 510 at a predetermined distance can be defined as the second or third operational mode. First, describing the second operational mode can refer when the display 610 is disposed in front of the upper case 510, and when viewing the display device 100 from the front can indicate that the display 610 and the upper case 510 overlap each other by more than a reference value. This second operational mode, in contrast to the third operational mode described later, can be referred to a landscape mode.

When the display device 100 is in the second operational mode, the display 610 on the front side can interrupt audio output through a speaker provided in the upper case 510, requiring control of the audio output. The second operational mode, as shown in FIG. 6(b), is a mode that operates to reproduce content in a rectangular shape, similar to a general display, with a long horizontal length and short vertical length. In contrast, the third operational mode, as shown in FIG. 6(c), is a mode that operates to reproduce content in a state where the display 610 is rotated in a certain direction about the vertical axis of the lower case 520 compared to the second operational mode, where the display 610 is short in width and long in height. In this sense, the third operational mode can be referred to as a portrait mode, to be distinguished from the second operational mode.

In the above, the rotation angle can be, for example, 90 degrees as shown in FIG. 6(c), but is not limited thereto. Alternatively, the third operational mode can be defined as encompassing all situations other than the first and second operational modes. Therefore, in the third operational mode, the display 610 can be at an angle formed between the lower case 520 or the reference surface, or between the upper case 510 and the lower case 520. Thus, the third operational mode includes not only when the display is rotated in a certain direction by a certain angle in the second operational mode, but also all other situations except for the first and second operational modes. The third operational mode will be described as shown in FIG. 6(c) for convenience.

Figure 7:
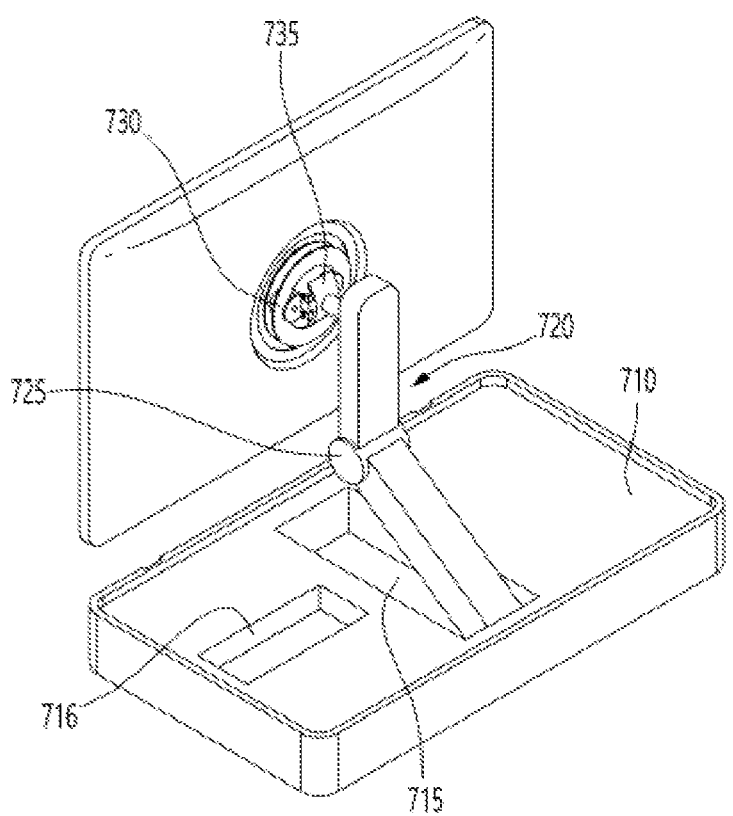
FIG. 7 is a perspective view illustrating a configuration of a display and a lower case.

Next, FIG. 7 shows the structure of the display device 100 that supports the movement of the display 610 in relation to the display operational modes. For clarity, only the lower case 520 and the display 610 are depicted in FIG. 7. Additionally, a perspective view illustrating the rear surface of the display 610 is presented to facilitate the understanding of state changes corresponding to different operational modes.

Referring to FIG. 7, a base (or stand base) 710 can be provided inside the lower case 520. The base 710 can be designed to a predetermined thickness or height to accommodate or support the display 610. At least one receiving groove or recess 715 and 716 can be formed in the base 710. A mechanism can be mounted or accommodated in a first receiving groove 715. The mechanism can include a foldable stand (or pedestal, lever, etc.) 720. A second receiving groove 716 can accommodate the remote control device 200. Further, the depth of each receiving groove can be determined based on the dimensions of the folding stand 720 and remote control device 200.

A separate fixing mechanism or coupling mechanism can be provided on the base 710 to fix or combine a component provided on the lower part of the rear surface of the display 610, so that the display 610 can be fixed to or detached from the lower case 520. The fixing unit or coupling unit can support a configuration or structure for the fixation or coupling can be released when a user applies a predetermined pressure.

In addition, the foldable stand 720 can either directly contact the rear surface of the display 610 or be coupled with a mounter 730 provided on the rear surface to support the movement of the display 610, or be fixed or moved at an arbitrary position. The mechanism can be designed as a configuration such as a hinge-foldable type, allowing the display 610 to be moved at various angles and positions, such as up and down, left and right, and so on.

Further, the foldable stand 720 can include a first stand part attached to or fixed to the receiving groove 715 and a second stand part connected to the mounter 730 formed on the rear side of the display 610. The first stand part and the second stand part can be connected to each other by the hinge 725 and moved at an arbitrary angle. In addition, the first stand part can support for the second stand part.

In contrast to FIG. 7, multiple hinges can be utilized for the foldable stand 720. In addition, the hinge can be referred as an example to support vertical movement of the display 610, but is not limited thereto. Additional hinges can be provided, for instance, to support the left and right movement of the display 610 separately, or a structure where a single hinge supports both up-down and left-right movements can also be employed. Such a hinge can include a pivot hinge, for example.

The other end of the foldable stand 720 (e.g., one end of the second stand) can be fitted with a connector (or coupler) 735 that has a structure or shape designed to be coupled or attached to the mounter 730. The connector 735 can be integrated with the mounter 730 and can have a structure or shape that can support rotational motion in addition to the vertical and horizontal adjustments of the display 610.

The display 610 can be tilted at any arbitrary or desired angle from the lower case 520 (or reference plane) or repositioned and secured in place after detaching from the lower case 520. The display device 100 can also include at least one speaker provided in the upper case 510 based on a relationship between at least one speaker provided in the upper case 510 and the display 610 which is connected to the lower case 520. The output of the at least one speaker can be adjusted and controlled accordingly. The aforementioned relationship or relationship information can refer to the operational mode mentioned above, but is not limited thereto.

The first operational mode (i.e., the basic operational mode) shown in FIG. 6(a) can cause the display 610 to interfere with or block the speaker's output or have no impact on the output. However, in the second and third operational modes shown in FIG. 6(b) or (c), the display 610 can be positioned toward the upper case 510 (i.e., in front of the speaker in the output direction), which can either entirely or partially block or interfere with the output of the speaker. In such a instance, the user can recognize a change in audio output. In particular, in the relationship between the display 610 and the upper case (i.e., speaker) as shown in (FIG. 6(b) or (c), the display 610 is located in front of the speaker's output direction, and because sound waves are obstructed by obstacles, the display 610 can be an obstacle that can affect the audio output. The arrangement relationship between the two components can cause effects such as sound reflection, diffraction, transmission, and sound absorption. In other operational modes, even if there is no actual change in the speaker output, the user can recognize a difference in sound quality (e.g., a deterioration), leading to inconvenience.

Figure 8:
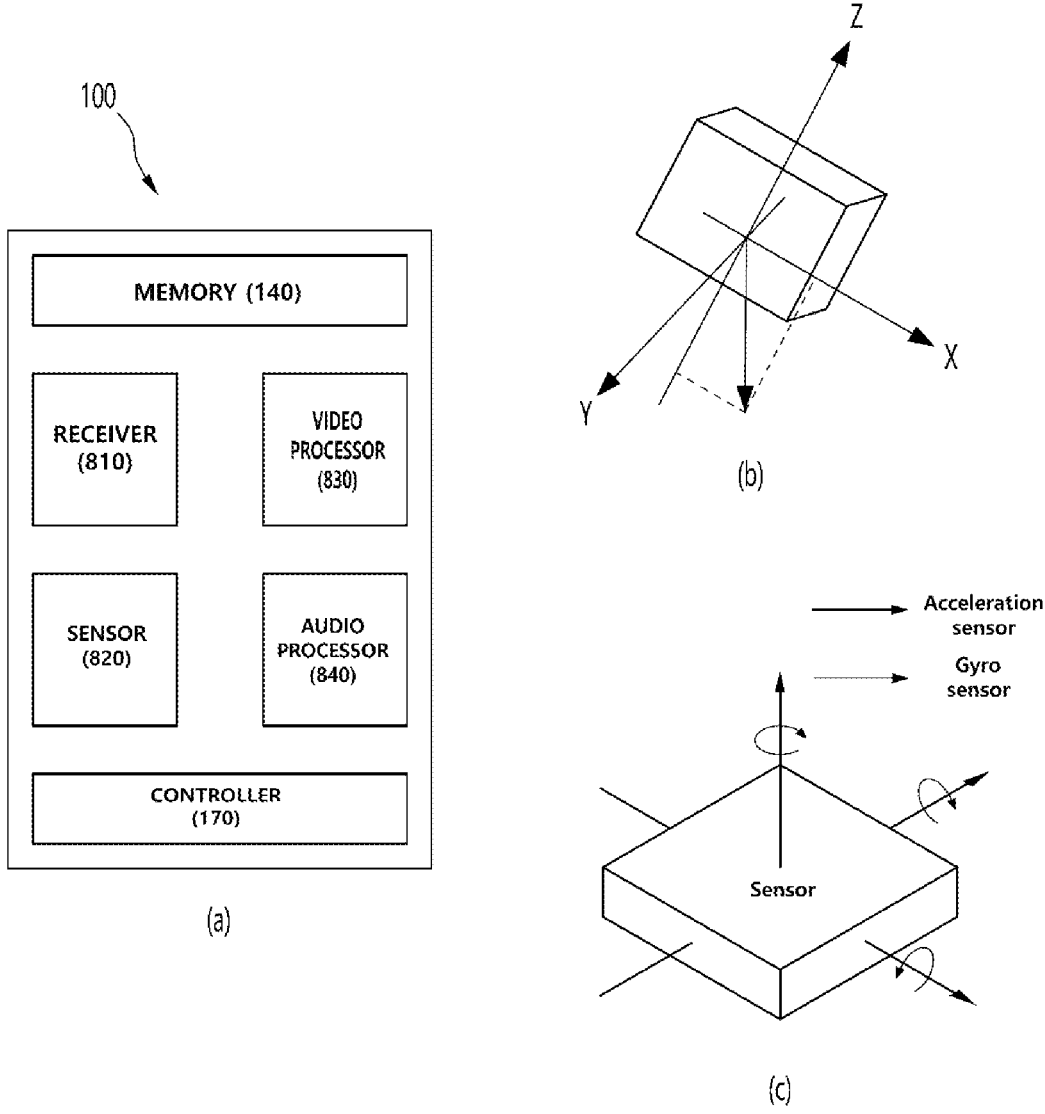
FIG. 8 is a block diagram of a display device according to another embodiment of the present disclosure.

Next, FIG. 8 is a block diagram of a display device 100 according to another embodiment of the present disclosure. In particular, FIG. 8 illustrates configurations related to adjusting or controlling the output of the speaker according to the operational mode of the display, but is not limited to such configurations. For instance, one or more components as shown in FIG. 1 can be further included.

Referring to FIG. 8, the display device 100 can include a memory 140, a receiver 810, a sensor unit 820, a controller 170, a video processor 830, and an audio processor 840. The memory 140 can store various information or data that are received by or generated by the display device 100.

In addition, the memory 140 can store control parameters and settings related to or for each operational mode of the display device 100 as shown in FIGS. 6(a)-(c). Also, the stored control contents can include audio control contents that are preset according to each operational mode (e.g., preset information about the characteristics of the display 610 and the output characteristics of the speaker in the first to third operational modes). Mapping can also be performed in tabular form.

Further, the display device 100 can refer to the mapped control contents according to the operational mode and automatically apply the contents as a macro function. More specifically, when the operational mode is changed from the second operational mode to the third operational mode, the display 610 can be rotated and output the displayed content in a certain direction, while the output of the speaker can be adjusted according to the control contents mapped for this mode. A value set according to the selected operational mode can be applied. Unlike the second operational mode, the display 610 may not block all of the speaker's output directions in the third operational mode. Further, the display 610 can completely overlap with or interfere with the output directions of the speaker in the second operational mode. A value different from audio control or a different method can be applied.

In addition, the memory 140 can store pre-mapped information or data on settings that are input by a user, or output adjustments that are automatically determined or set for displays and speakers, depending on the position of the display 610. Furthermore, the memory 140 can receive user feedback information or data for values in the table information via a receiving unit 810, which will be described later, and update the pre-mapped information accordingly.

The receiving unit 810 can receive a user's input for the display device 100. The receiver 810 can have the same configuration as the user input interface 150 of FIG. 1 or a separate configuration. The user input can include touch inputs when the display 610 adopts a touch screen. Meanwhile, the user input can include an IR input from the remote control device 200 shown in FIGS. 2 to 4 or a mobile terminal connected to the display device 100 when a non-touch screen is used. Additionally, the user input can also include voice commands received through a connected artificial intelligence speaker (AI speaker), or gesture input received from a wearable device. The user input can be a combination of the various inputs mentioned above, and the receiver 810 can process signals based on the aforementioned inputs or their combinations. The sensor unit 820 can sense movement of the display 610.

For motion sensing of the display 610, an acceleration sensor shown in FIG. 8(b) or a gyro sensor shown in FIG. 8(c) can be included. However, this is only an example, and is not limited thereto. In FIG. 8(b), the sensor unit 820 can detect gravitational acceleration using an acceleration sensor and obtain a G value in each axis direction. In this instance, G can represent the unit of acceleration where the standard gravitational acceleration has a value of 1G.

The present disclosure discloses the following process for processing the movement of the display 610, that is, determining the operational mode of the display device 100 through the acceleration sensor.

The sensor unit 820 can detect the amount of rotation per time unit in the X, Y, and Z axes, in addition to the operation of each axis sensor through the gyro sensor.

The controller 170 can retrieve motion data of the display 610, specifically the coordinate values of the X, Y, and Z axes, from the sensor unit 820 to determine the operational mode of the display. The controller 170 can identify the operational mode of the display 610 in real-time by utilizing the movement data obtained from the sensor unit 820, which includes the X, Y, and Z-axis coordinate values. Based on this identification, the controller 170 can perform various control functions such as adjusting and controlling the output of at least one speaker through the audio processing unit 840 or controlling the operation of the video and audio processing units 830 and 840 for content output through the display 610.

When the motion data of the display 610 through the sensor unit 820 is corresponded to a predetermined reference value (e.g., an absolute value), the controller 170 can determine the operational mode of the display 610. When the motion data of the display 610 through the sensor unit 820 is corresponded to a relative value (e.g., a difference) that is equal to or greater than the standard, the controller 170 can determine the operational mode of the display 610. The controller 170 can adjust the speaker output according to the determined operational mode.

However, if the received motion data of the display 610 does not meet a predetermined threshold (e.g., based on an absolute value or a relative value), the controller 170 may not determine the operational mode of the display and may not adjust the output of the speaker accordingly. If the value (or difference) is below the predetermined reference value, the controller 170 may not determine the operational mode of the display 610. In such instances, the controller 170 can refer to a pre-mapped table that associates different degrees of speaker output control with reference values. Based on the value mapped to the table, the controller 170 can adjust the output of the currently used speaker accordingly.

In addition, the sensing data collected by the sensor unit 820 can be analyzed by the controller 170, for example every time new data is received. Alternatively, the controller 170 can collect sensing data through the sensor unit 820 periodically or irregularly and perform analysis of the collected sensing data regularly or irregularly.

When the sensor unit 820 collects sensing data, the controller 170 can obtain the relationship information (e.g., angle information) between the upper case 510 and the lower case 520, for example. Analysis of the collected sensing data can be performed periodically or irregularly,

TABLE 1

| Operational Mode | X | Y | Z |
|---|---|---|---|
| First operation mode (Turn-table operational mode) | Display Movement data | Display Movement data | Display Movement data |
| Second operation mode (Landscape operational mode) (Horizontal mode) | Display Movement data | Display Movement data | Display Movement data |
| Third operation mode (Portrait operational mode) (Vertical mode) | Display Movement data | Display Movement data | Display Movement data |

Further, referring to FIG. 8(c), the gyro sensor is an example of a 6-axis gyro sensor that senses angular velocity (3-axis) and acceleration (3-axis) values per second by embedding an acceleration sensor, but is not limited to this.

and can be limited to instances where the obtained relationship information (i.e., angle information between the upper case 510 and the lower case 520) exceeds a predefined threshold value.

Further, the video processing unit 830 can process video data differently depending on the operational mode of the display. For instance, the controller 170 can adjust the relative importance of video data, such as prioritizing still images or text-oriented data over moving images in the first or third operational modes. As a result, the video processing unit 830 can output the data after processing it at a lower resolution than the original data (e.g., reducing 4K resolution to Full-HD resolution). This approach not only can help reduce power consumption of the display device 100, but also can enhance data processing speed by processing Full-HD resolution video data instead of ultra-high resolution video data. As a result, resources are efficiently utilized, leading to more efficient operations. Conversely, in the second operational mode where video output is relatively important compared to other modes, the video resolution of the original content can be increased. However, the above is just an example, and the present disclosure is not limited to the example.

For example, the audio processing unit 840 can process audio data that constituting content differently depending on the operational mode of the display. For example, under the control of the controller 170, the audio processing unit 840 can process audio data so that sound is output in the first EQ mode (basic mode) when the first operational mode is selected.

Further, under the control of the controller 170, the audio processing unit 840 can process audio data to be serviced in the second EQ mode when the second operational mode is selected. Also, under the control of the controller 170, the audio processing unit 840 can process audio data to be serviced in the third EQ mode when the third operational mode is selected. Accordingly, the display device 100 can control the output of video and/or audio according to the identified operational mode of the display, and output the content accordingly.

Figure 9:
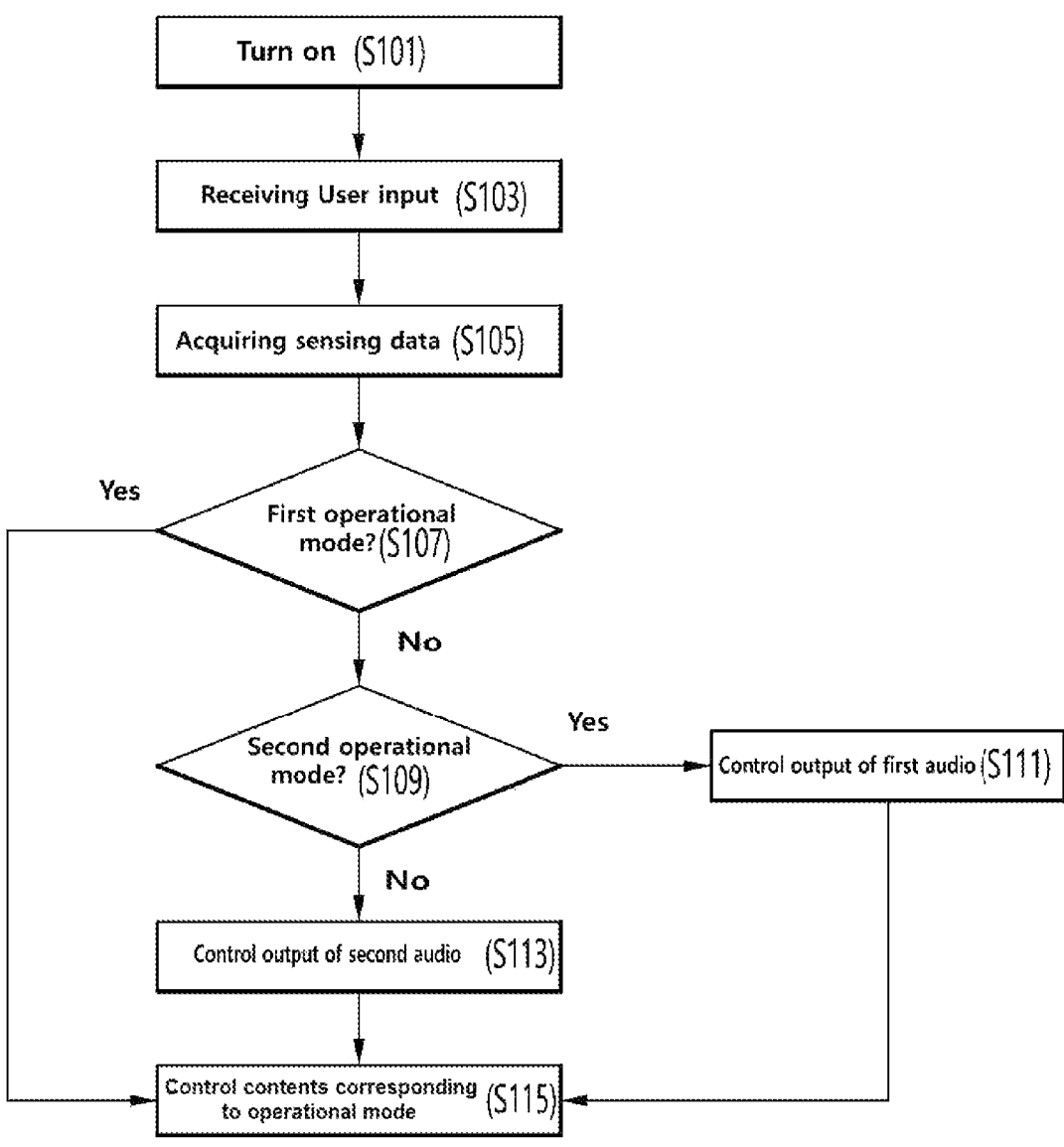
FIG. 9 is a flowchart illustrating an audio data processing method according to an embodiment of the present disclosure.

Next, the operation of the audio processing unit 830 is described in detail. Referring to FIG. 9, when the display device 100 is turned on (S101), the controller 170 can receive a user input (S103). In the above, "turn-on" can indicate, for example, a state in which power is being supplied to the display device 100. However, even if power is supplied to the display device 100, the state can be not considered to be in the turn-on state if the content output ready state is not in the first to third operational modes, as shown in FIG. 6, that is, if the upper case 510 is not open or if the display is not exposed to the outside. If the user selects to close the upper case 510 of the display device 100 during content playback in the first to third operational modes without transmitting or selecting an end input, the display device can output only audio (with video turned off) for a predetermined period of time to reduce power consumption. In this instance, the display device may not be considered to be in the turn-on state as previously mentioned.

The process of receiving a user input can be omitted, or alternatively, the user can simply move the display device 100 around in space according to their preference. For instance, if the user decides to manually position the display 610 instead of using the remote control device 200, the operational mode change signal detected by the sensor can be replaced by the user's input, thereby eliminating the need for step S103.

In addition, the display device 100 can also select a specific operational mode by using an input device such as the remote control device 200. In this instance, the display device 100 can automatically release and move the display

610 to the corresponding position and fix it according to the selected operational mode or vice versa through the mechanism.

In step S105, the sensor unit 820 can sense the operational mode data of the display 610 through the sensor(s) shown in FIG. 8(*b*) or (*c*). The controller 170 can acquire the operational mode data of the display 610 from the sensor unit 820. In the present disclosure, the sensor unit 820 can be embedded in the display 620.

Further, the sensor unit 820 can transmit the sensing values obtained from the sensor as raw data to the controller 170. The sensor unit 820 can replace them with data according to the relationship between the upper case 510, lower case 520, or reference surface and the display 610, as described above, and transmit them to the controller 170.

In step S107, the controller 170 can determine whether the current display 610 is in the first operational mode by using the sensing data about the operational mode of the display 610 obtained in step S105. When the controller 170 identifies that the display device 100 is in the first operational mode (Yes in S107), the controller 170 can control the content to be output as it is without sending a separate control command, as there is no need for controlling the current speaker output.

In step S109, the controller 170 can determine whether the display 610 is in the second operational mode again if it is determined in step S107 that the display 610 is not in the first operational mode (No in S107). In step S111, the controller 170 can transmit a first audio output control signal to the audio processing unit 840 if it is determined in step S109 that the display 610 is in the second operation mode (Yes in S109).

Further, at step S113, if the controller 170 determines from the result of the judgment in step S109 that the display 610 is not in the second operational mode (No in S109), the controller 170 can determine that it is in the third operational mode and transmit a second audio output control signal to the audio processing unit 840. If there are multiple operational modes, additional steps can be taken to determine the status of each operational mode. In step S115, the controller 170 can control the content to be output through the display 610 according to each operation mode.

Figure 10:
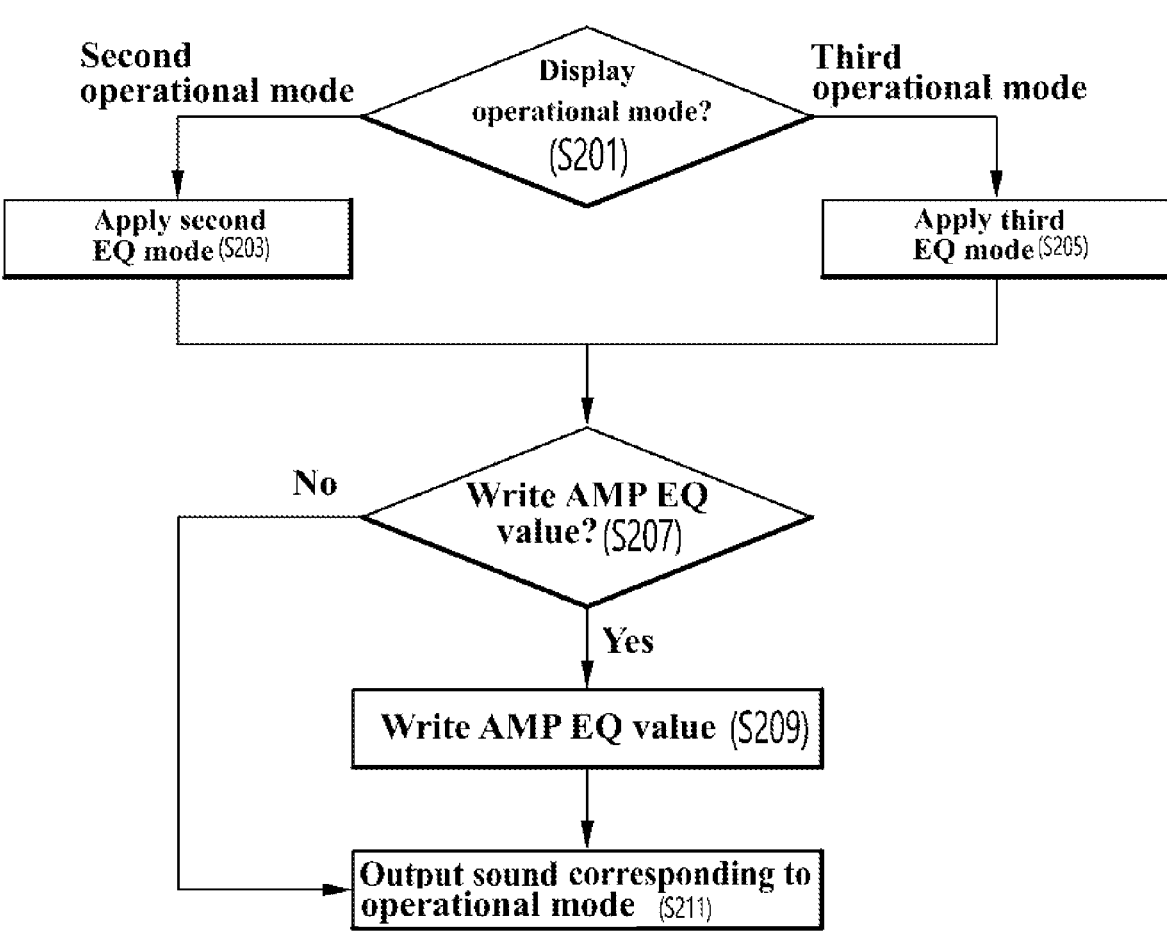
FIG. 10 is a flowchart illustrating an audio data processing method according to another embodiment of the present disclosure.

Next, FIG. 10 describes an example of audio output control. In particular, in FIG. 10, the second and third operation modes are explained because controlling audio in the first operation mode can be omitted. At step S201, the controller 170 can determine the operation mode of the display device 100. The first EQ mode can represent the EQ mode originally applied in the first operational mode.

In step S203, the controller 170 can determine the application of the second EQ mode based on the determined result of step S201, for the second operation mode. The value of the second EQ mode can be a value that is at least partially different from the value of the first EQ mode. In step S205, the controller 170 can determine the application of the third EQ mode if it is determined in step S201 that the display device 100 is not in the second operation mode. The third EQ mode value can be different from the values of the first or second EQ modes and can include at least some modified values of the first EQ mode value (or the second EQ mode value).

At step S207, the controller 170 can determine whether to perform a write operation of AMP EQ values corresponding to the EQ mode being applied to the display device 100 in accordance with the EQ mode determined in step S203 or S205. In step S209, the controller 170 can perform a write operation for the corresponding AMP EQ value based on the user's input or settings, if there is no write operation for the AMP EQ value in the previous step S207. In step S211, the controller 170 can control the sound to be output according to each operational mode.

Referring to FIGS. 11 and 12, the EQ mode in FIGS. 9 and 10 is described as follows. As described above, the display device 100 can be equipped with at least one speaker in the upper case 510. The present disclosure describes an example in which the upper case 510 can be equipped with two speakers. In this instance, one of the two speakers can be a full-range speaker that is responsible for audio output in a relatively wide frequency band, and the other can be a tweeter speaker that is responsible for audio output in a relatively narrow frequency band. In this instance, the tweeter speaker can be responsible for audio output in a high frequency band. However, this is merely an example.

Figure 11A:
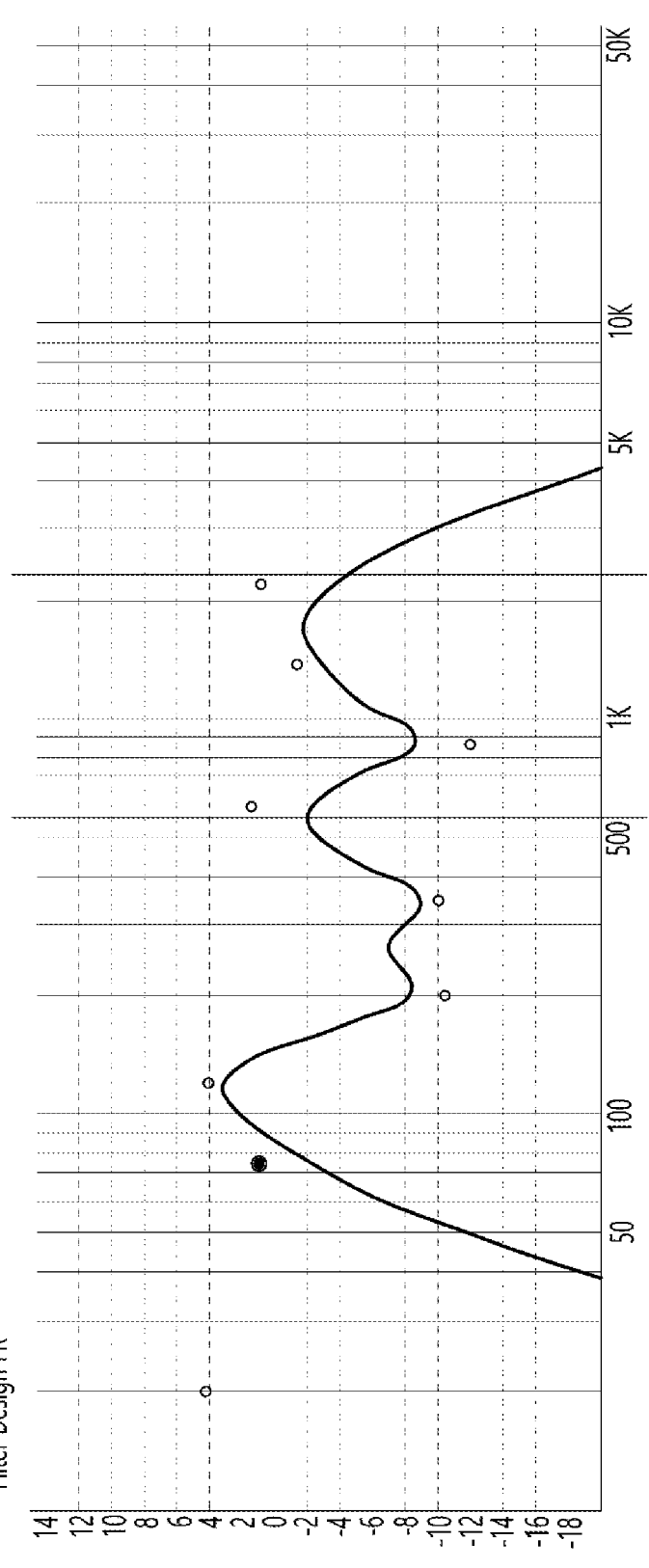
FIGS. 11A-11C and 12A-12C are graphs illustrating an audio data processing method according to each display operational mode.
Figure 11B:
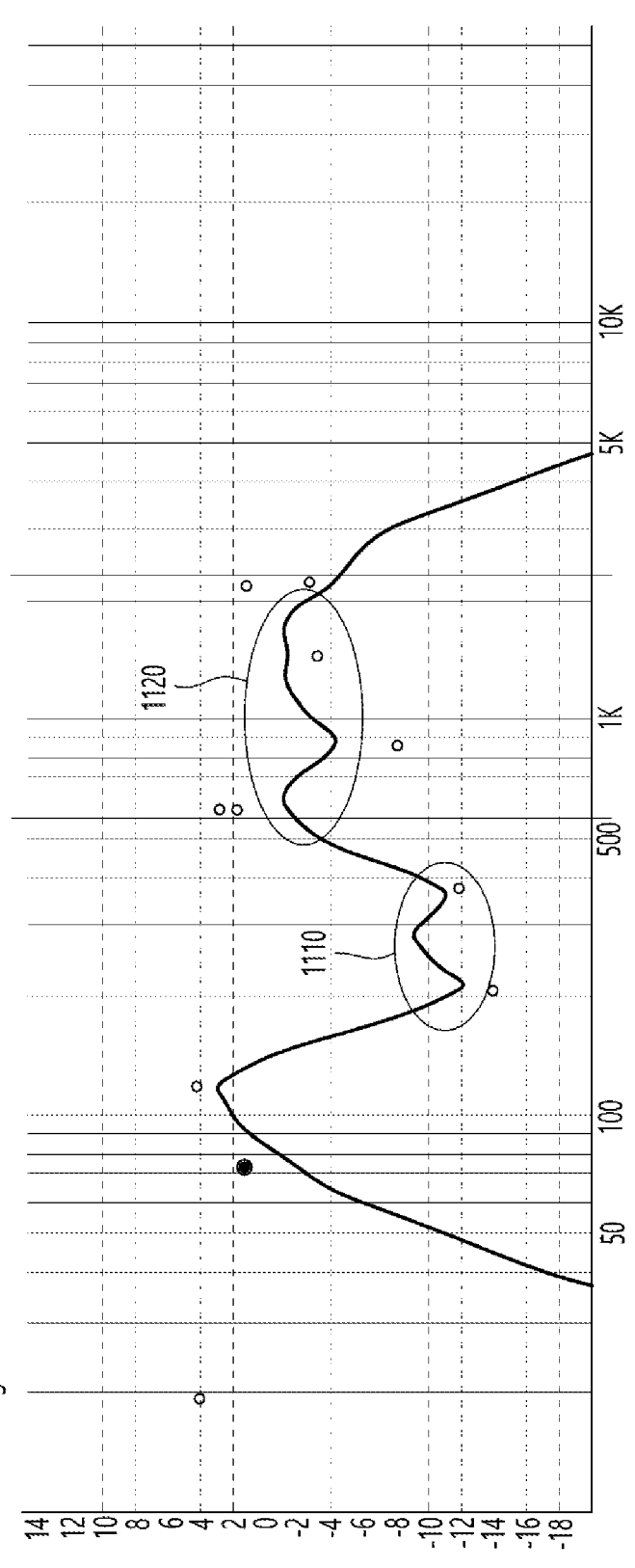
Figure 11C:
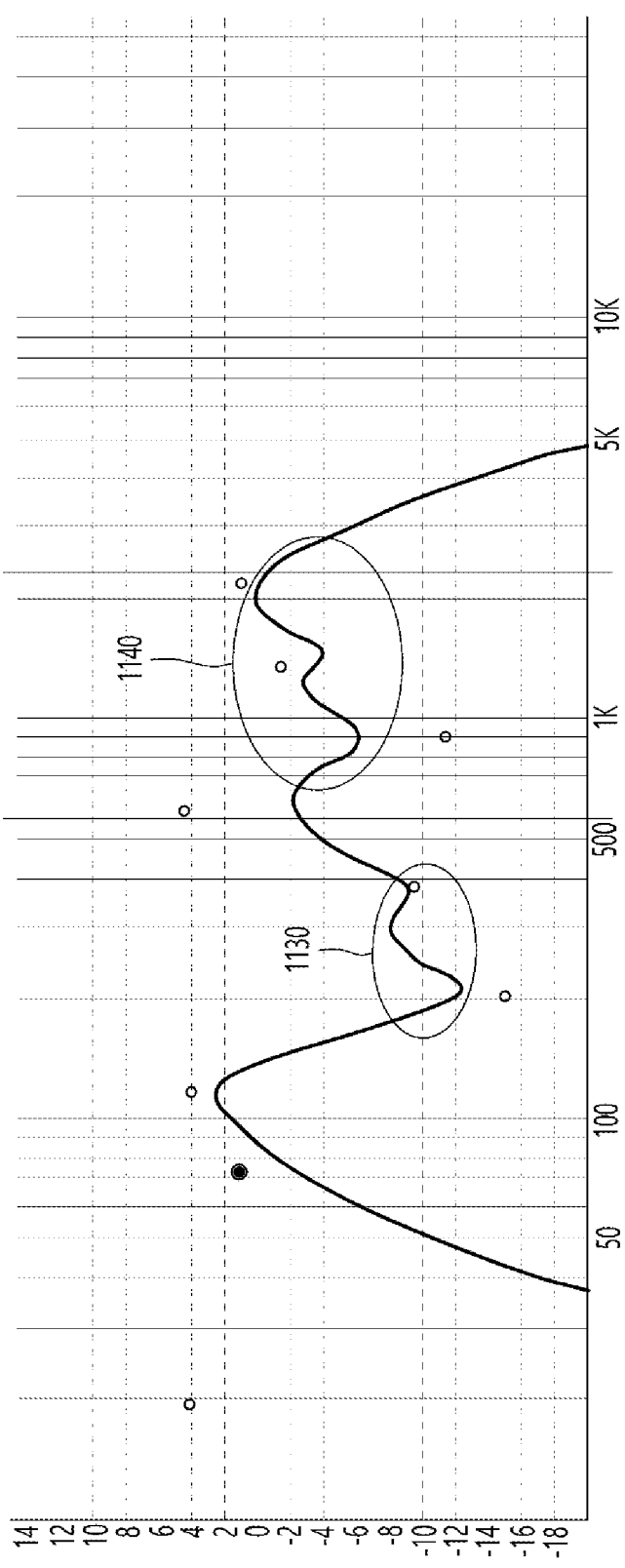
Figure 12A:
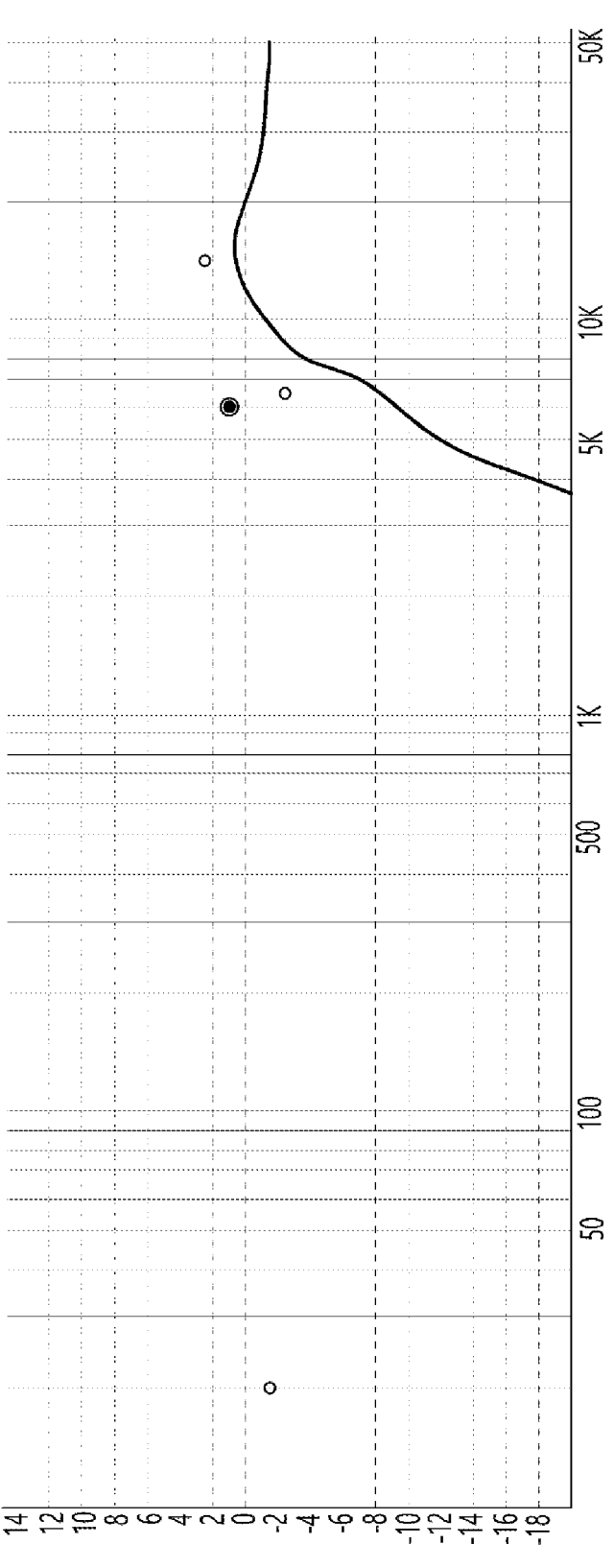
Figure 12B:
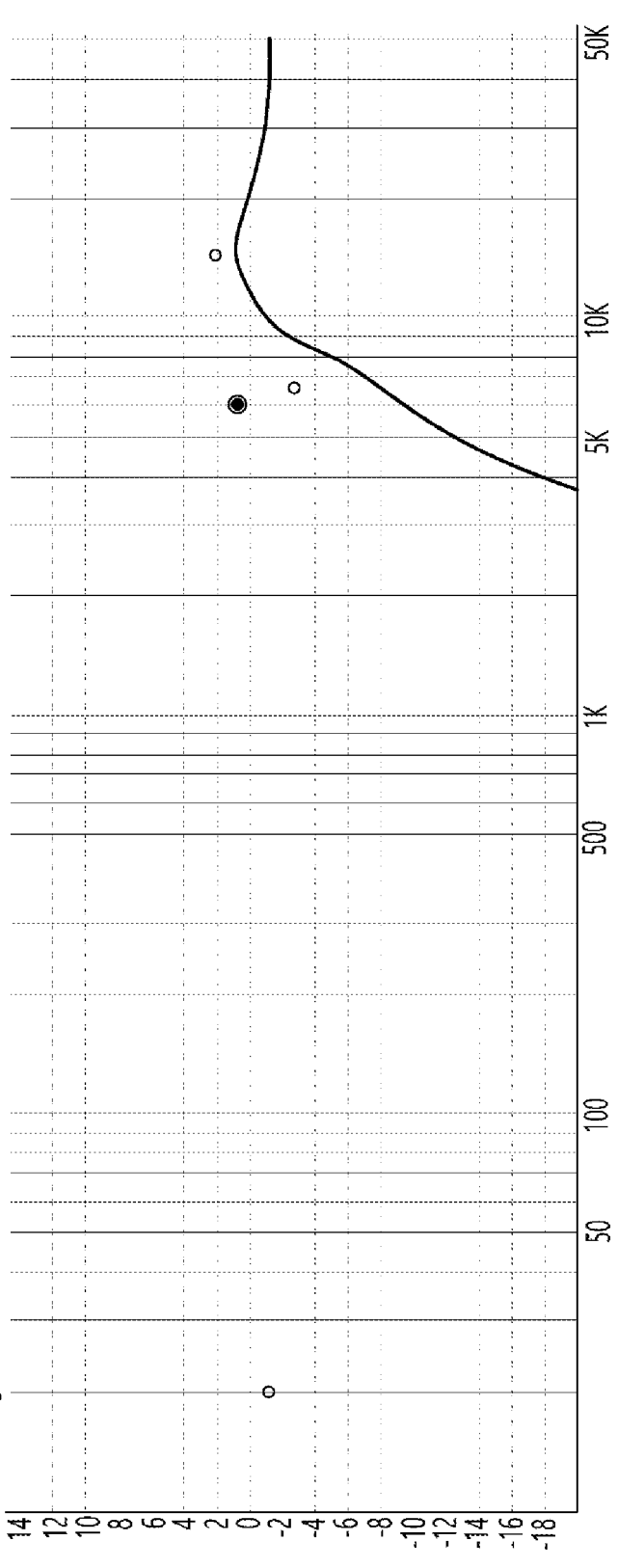
Figure 12C:
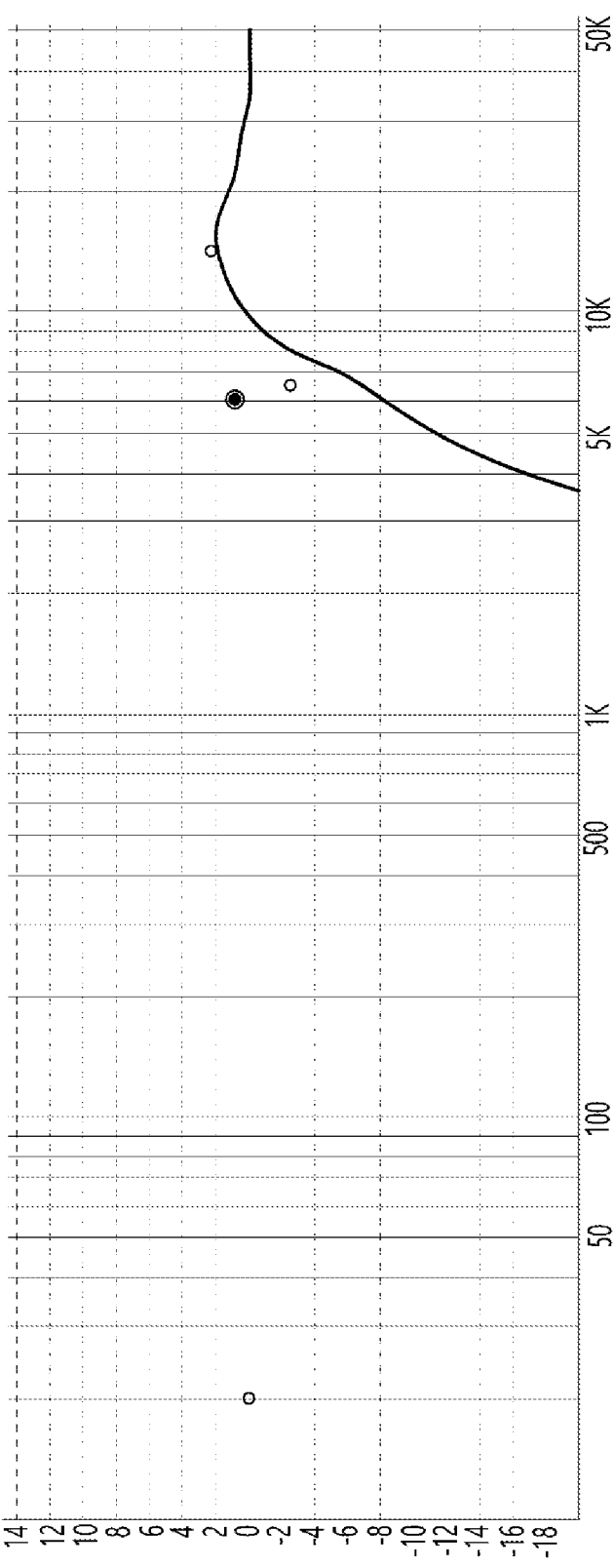

In more detail, FIGS. 11 and 12 are graphs for comparing and describing output control of a full-range speaker and a tweeter speaker according to an operational mode of the display device 100, respectively. Furthermore, each graph of FIGS. 11 and 12 can represent, for example, each of the aforementioned EQ modes. For instance, FIGS. 11(a) and 12(a) are the first EQ mode, FIGS. 11(b) and 12(b) are the second EQ mode, and FIGS. 11(c) and 12(c) can be a third EQ mode.

First, the output of the full-range speaker of FIG. 11 will be described. In particular, FIG. 11(a) can represent the output setting of the full-range speaker in the first EQ mode, which corresponds to the first operation mode of the display device 100. The first operation mode can refer to when the display 610 is fixed to the bottom case 520 as shown in FIG. 11A. In this instance, the full-range speaker can be provided (or built-in) in the front of the upper case 510, and there is no overlap between the audio output direction of the full-range speaker and the display 610, so separate control over the audio output of the full-range speaker can be omitted.

In FIG. 11A, the output of the full-range speaker can be used as a reference for adjusting the speaker output in other operational modes. The control of the output adjustment of the full-range speaker according to each operational mode shown in the FIGS. 11B and 11C is described in contrast to the output of the full-range speaker in the first operational mode (i.e., the first EQ mode) shown in the graph FIG. 11A.

FIG. 11B can represent the setting of the full-range speaker output in the second operational mode of the display device 100, i.e., the second EQ mode. By referring to the graph in FIG. 11B, the full-range speaker output in the second operational mode can be controlled in at least one frequency range compared to the output in the first operational mode shown in the graph in FIG. 11A. For example, in FIG. 11B, the output in the first frequency range 1110 can be relatively reduced while the output in the second frequency range 1120 can be relatively increased compared to FIG. 11A, but is not limited thereto. Furthermore, the full-range speaker output of the display device 100 in FIG. 11B can be referred to as the second EQ mode, such as that in FIG. 9.

FIG. 11C can represent the output adjustment of the full-range speaker in the third operation mode of the display device 100, namely the third EQ mode. Referring to the graph in FIG. 11C, the output adjustment of the full-range speaker in the third operation mode can control the output in at least one frequency range relative to the full-range speaker output in the first operation mode in FIG. 11A. For example, the output in the first frequency range 1130 can be relatively decreased while the output in the second frequency range 1140 can be relatively increased. However, this is not limited to these frequency ranges. Meanwhile, the output of the full-range speaker in FIG. 11C in this mode can be referred to as the third EQ mode (e.g., of diagram 9).

Further, comparing the graph in FIG. 11C to the output of the full-range speaker in the second operational mode on the graph in FIG. 11B illustrates that the first frequency range 1110 and 1130 is similar in both graphs. However, in the lower sub-range, which corresponds to the relatively lower frequencies in the first frequency range 1130, the output in FIG. 11C can decrease more than in FIG. 11B. Additionally, in the second frequency range 1120 and 1140, the output in the sub-range corresponding to the relatively lower frequencies in the second frequency range 1140 can decrease more than in FIG. 11B. Conversely, in the sub-range corresponding to the relatively higher frequencies, the output in FIG. 11C can increase more than in FIG. 11B. Further, unlike the graph in FIG. 11, the audio output frequency range and level can vary depending on the content. Therefore, the following examples can be referred to or combined.

In an embodiment, the control of the EQ modes for each operational mode can be divided into frequency ranges that have the most impact on the user's listening experience and those that do not, due to display 610 interference with the speaker output in the audible frequency range of 20-20,000 Hz. For the latter instance, where the amplification effect of the user's listening due to audio output control can be minimal, the target frequency range can be excluded from the control and only the former frequency range can be controlled for audio output. In this instance, the method of controlling audio output can vary. Further, the frequency range that contributes to the user's listening amplification effect, i.e., the target of audio output control in the former, can be individually controlled by dividing it into at least one sub-frequency range, considering personal information such as the user's age and gender, content attributes, and the like.

In another embodiment, the control of the EQ mode for each operational mode can be achieved by outputting the audio in the same manner as in a first operational mode and receiving the measured audio output (e.g., measured audio levels at a pre-set user location) in a different operational mode. The measured levels can then be compared between the first operational mode and the different operational mode. For example, as shown in graphs of FIG. 11, the frequency ranges where the measured audio levels differ by a threshold or more can be selected as candidate frequency ranges, and at least one of the selected candidate frequency ranges can be determined as the final target frequency range for audio control. Audio can then be controlled for the determined frequency range. In this instance, only one or more frequency ranges with the largest differences in audio levels can be determined as target control ranges. The criteria for audio level control can include calculating the average level difference of all candidate frequency ranges where the levels differ by the threshold or more, or selecting the average level difference of the remaining level differences after excluding the largest and smallest differences, or selecting the largest level difference. Additionally, weights can be assigned to the candidate frequency ranges based on their relative importance, or frequency ranges that are thought to have relatively little impact, such as those outside the audible frequency range of 20-20,000 Hz that contribute to the user's hearing amplification effect, can be excluded.

In another embodiment, taking outdoor environments into consideration, ambient noise can be detected and the degree of audio level control can be adjusted differently according to the detected ambient noise (for example, a home has a noise weight of 1, while outdoors has a noise weight of 5)

by setting weights based on the detected ambient noise. In addition, individual weights can be further assigned based on factors such as time, weather, location, and the like, and can be reflected in the audio output control.

In still another embodiment, except for the first operation mode, in the second or third operation mode, even for the same content, the audio output can vary greatly on a frame or scene-by-scene basis. Therefore, the display device 100 can apply audio output uniformly depending on the operation mode, and if a change in audio output exceeding a pre-set threshold compared to the previous frame or scene can be detected (e.g., identifiable through a buffer), the change can be reflected in the audio output control being applied. The aforementioned can also apply even for changes in channels or contents, even within the same operation mode or channels.

In a similar manner, the aforementioned content can be applied to audio output control based on the number of users detected on the front or around the display device 100, the distance between the users and the device, and the degree or location changes of the users' movements. For example, preset weights can be assigned to the aforementioned number of users or distance between users and the device, and used as a reference for audio control.

As another example, the display device 100 can set values for each operation mode based on the output of the speaker itself, rather than the user's perspective. In this instance, the display device 100 can control the output by applying the preset speaker output values according to the operation mode change, while considering variables. These variables can include the conditions or weights mentioned above.

In addition, the display device (100) can utilize an AI engine, including a trained AI model, or receive and incorporate audio control content that generally provides users with comfortable or satisfactory listening experiences in each operation mode from a server (remote or cloud-based). Alternatively, after audio output control in each operation mode, the display device 100 can continue to update the AI model by learning from user feedback, enabling personalized audio output control for each operation mode.

Next, the output of the tweeter speaker as shown in FIG. 12 is described. As mentioned above, the output of the tweeter speaker can be primarily in the high-frequency band or range, and there may not be a significant difference due to changes in the operating mode. However, depending on the type or characteristics of the content, control of the tweeter speaker's output in accordance with the operating mode can also refer to the control details of the full-range speaker as previously described.

Next, FIG. 12A describes the output of the tweeter speaker. As mentioned above, the tweeter speaker output can be generally in the high-frequency range and is not significantly affected by changes in the operational mode, unlike the full-range speaker output described in FIG. 11. Specifically, FIG. 12A can represent the tweeter speaker output in the first operational mode of the display device 100, which is comparable to the output of the tweeter speaker in the second operational mode shown in FIG. 12B and the third operational mode shown in FIG. 12C. The output of the tweeter speaker, however, can slightly increase in the second operational mode, as shown in FIG. 12B, compared to the output in the first operational mode shown in FIG. 12A, and can slightly increase again in the third operational mode shown in FIG. 12C compared to the output in the second operational mode.

However, the speaker output of the tweeter, which is responsible for the relatively high-frequency band, can be considered to be less in need of adjusting the speaker output in relation to the operational mode of the display device 100, and may not be greatly affected by changes in operational modes compared to the full-range speaker. From this point of view, adjusting the speaker output in this disclosure can mean controlling the output of the full-range speaker rather than the tweeter speaker, but it is not limited to this.

As described in FIG. 10, the frequency range of the full-range speaker output in each operational mode, can be divided into at least two or more distinct frequency bands, and the control can be performed to change the output of each distinguished frequency band differently. For instance, if the distinguished frequency bands are a first frequency band for low-pitched sounds and a second frequency band for high-pitched sounds, the display device 100 can decrease the output of the first frequency band and increase the output of the second frequency band.

Further, the display device 100 can acquire sensing information about surrounding noise through the sensor unit 820, and can set weights for the acquired sensing information about surrounding noise so that the weights are reflected in the speaker output control according to each case mentioned above, i.e., according to the operation mode.

The display device 100 can pre-map and store control content of the display 610 in addition to the speaker's output based on the operating mode. The display device 100 can also pre-map and store brightness control content of the display 610 in addition to the speaker's output based on the operating mode. In this instance, similar to the speaker control method as described above, weights can be assigned to values sensed for ambient brightness, and the brightness or resolution of the display set according to the current operational mode can be additionally controlled based on the assigned weights.

Figure 13:
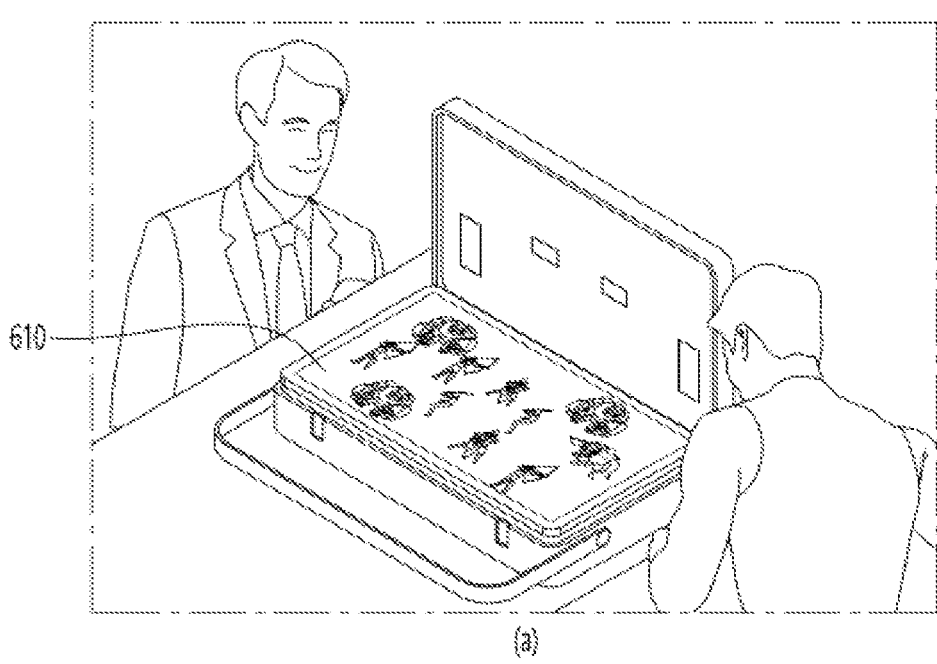
FIGS. 13 and 14 are diagrams illustrating use scenarios according to operational modes of the display device 100.
Figure 13:
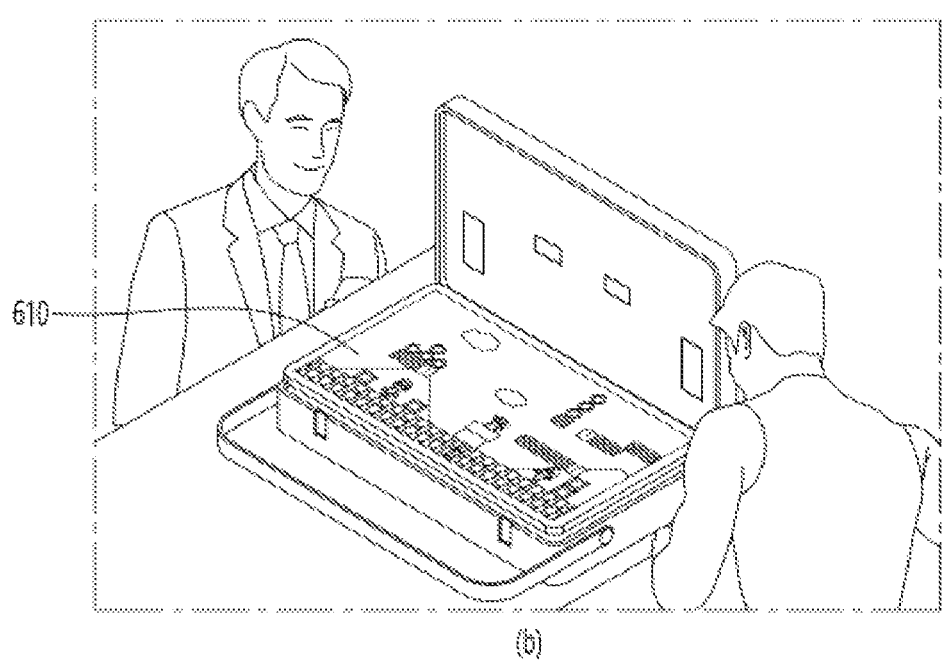
Figure 14:
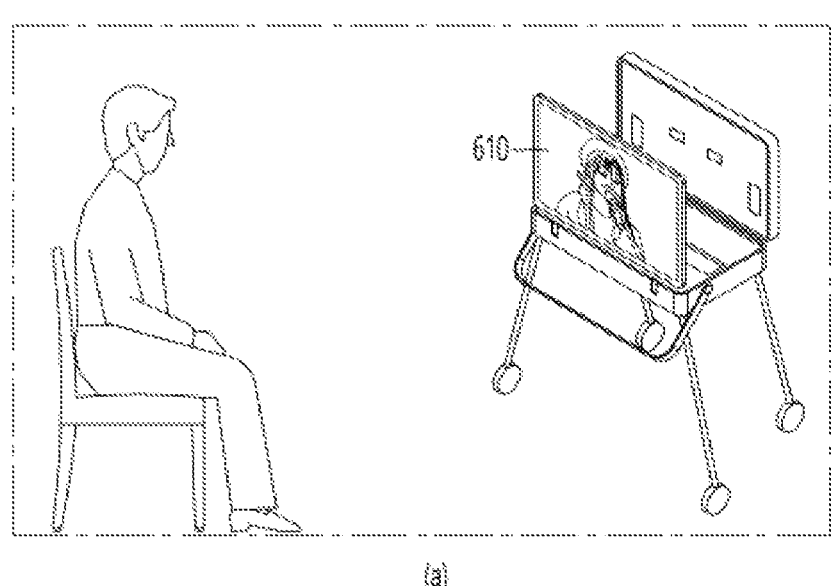
Figure 14:
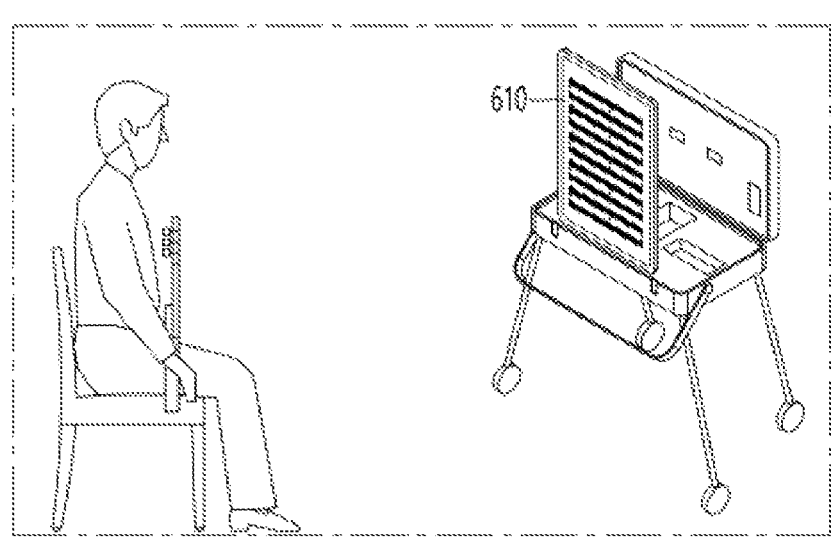

Next, FIGS. 13 and 14 are diagrams illustrating use scenarios according to operational modes of the display device 100. In particular, FIG. 13 illustrates an example of a usage scenario of the first operational mode of the display device 100 and FIG. 14 illustrates examples of usage scenarios of the second and third operational modes of the display device 100.

In FIGS. 13(a) and (b), the present disclosure relates to the first operational mode of the display device 100, which can provide game applications or web browser applications for single or multi-users. Additionally, the first operational mode can allow the use of the display device 100 as an audio-only device.

Further, in FIG. 14(a), the second operational mode of the display device 100 is illustrated, and in FIG. 14(b), the third operational mode is illustrated. When watching general videos or still images or when viewing broadcast programs, the content can be provided in the second operating mode as indicated in FIG. 14(a). Further, applications such as music apps providing sheet music can be provided in the third operating mode as indicated in FIG. 14(b). Here, 'provided' can indicate that, if not recommended or controlled separately by the user, the respective operating mode can be automatically switched to and offered to the user.

Further, the display device 100 can automatically switch to either the first to third operation modes depending on the attributes of the content that the user wants to playback. For example, when the user sends an input to execute a game application, the display device 100 can automatically switch to the first operation mode if the game application is deemed to have relatively more touch or other input. Alternatively, recommendation guides can be provided. In addition, when the user requests to execute a music application that outputs sheet music, as in FIG. 14(b), when playing a guitar or piano in front of the display device 100, the display device can automatically switch to the third operation mode or provide recommendation guides.

Figure 15:
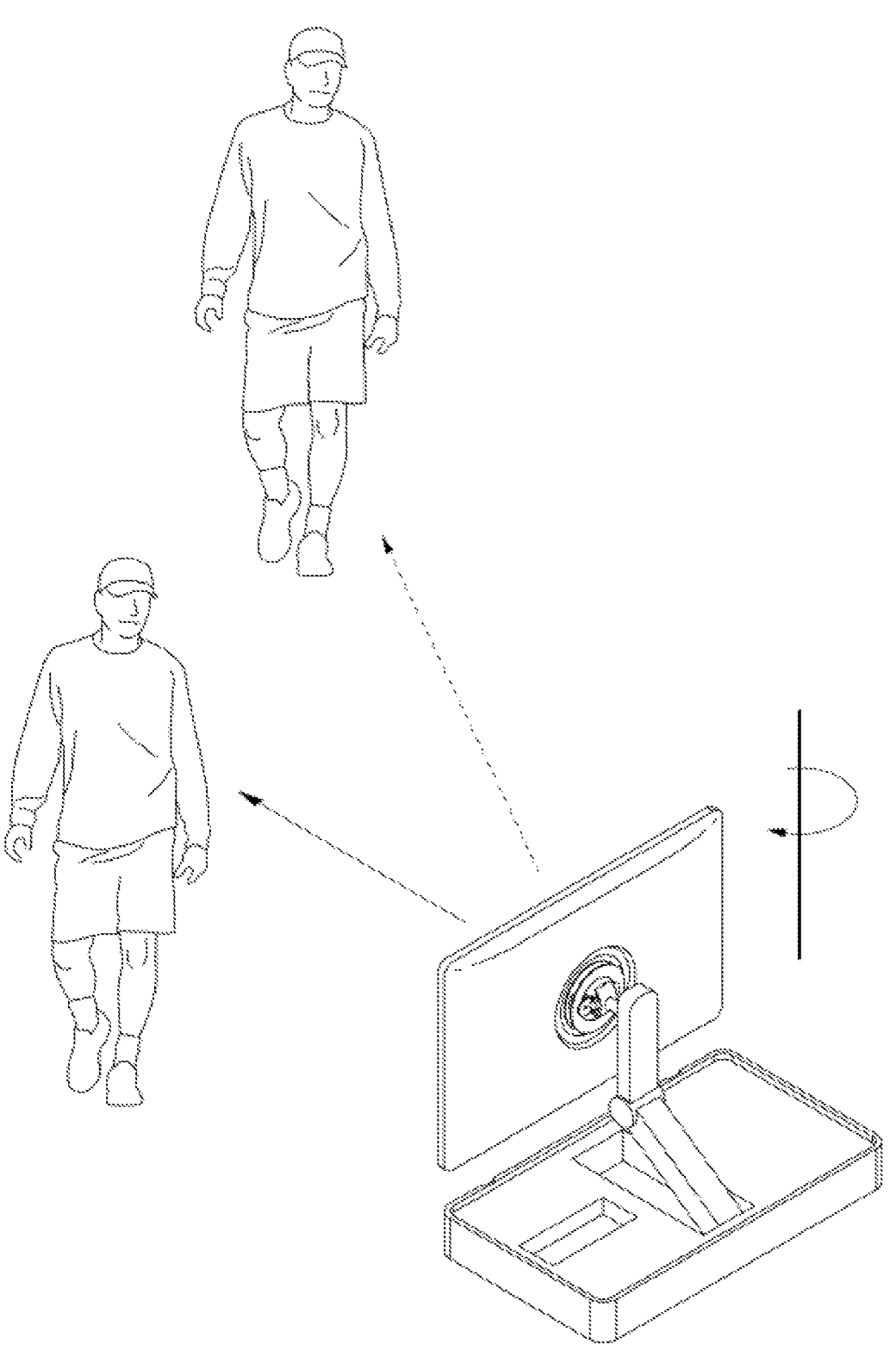
FIGS. 15 and 16 are diagrams illustrating control of the display device according to an object.
Figure 16:
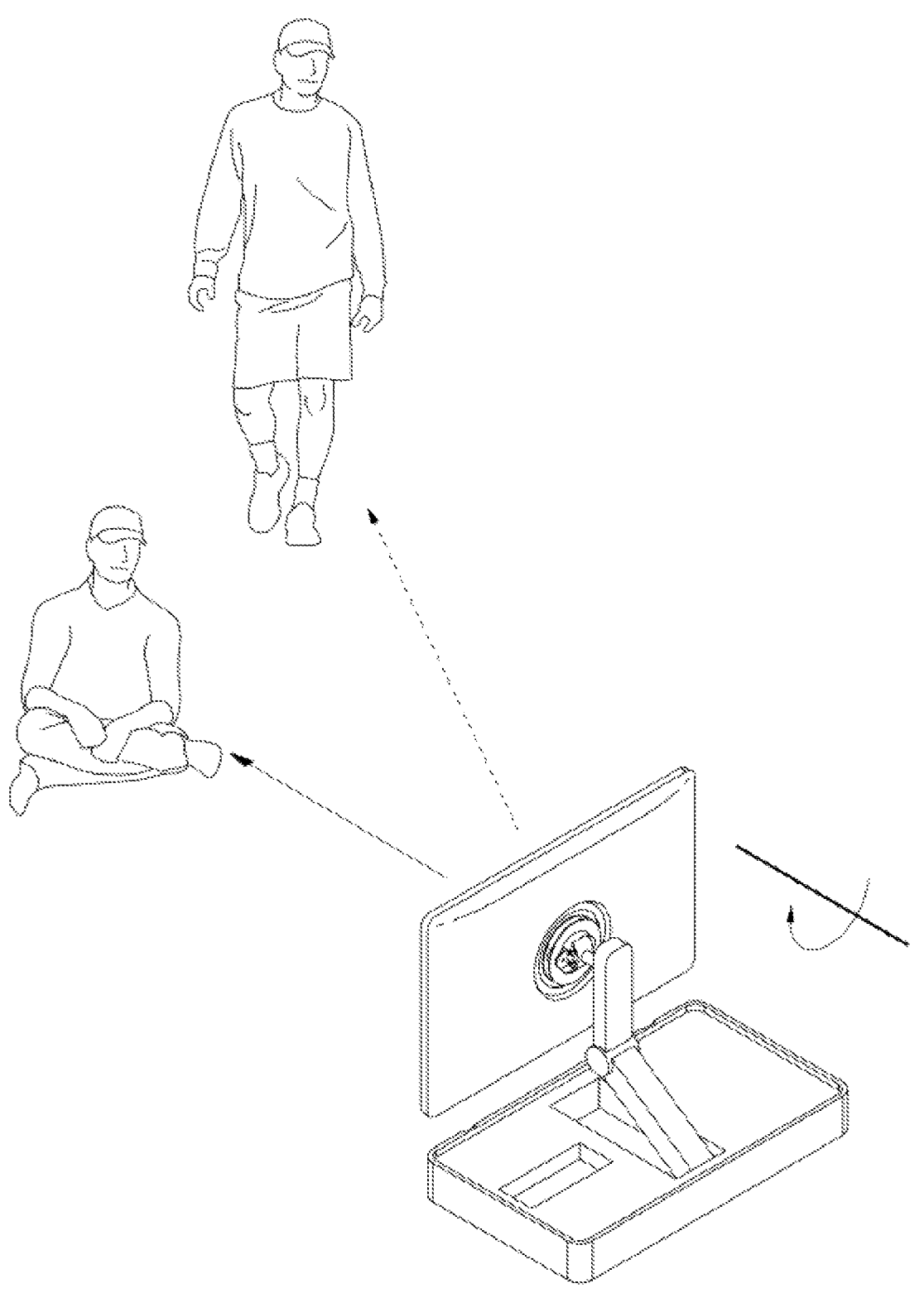

Next, FIGS. 15 and 16 are diagrams illustrating control of the display device 100 according to an object. The aforementioned operational modes of the display device 100 can be based on the assumption that an object (i.e., user) is located in front of the display 610. However, if the user assumed to be positioned in front of the display 610 in the aforementioned operation modes, as shown in FIG. 15, moves to the side, the user no longer faces the display device 100 and may not be able to properly view the content being displayed on the display 610.

In this instance, the display device 100 can detect the user's position and rotate at least one of the display 610 and the upper case 510 containing the speaker to allow the user to view the content as if they were facing the display as before, even if the user moves to the side as shown in FIG. 15. In addition, when at least one of the display 610 and the upper case 510 is rotated, the properties of the currently playing content can also be taken into consideration. For example, if video of content is more important than audio, only the display 610 can be rotated, and if audio of content is more important than video, the upper case 510 may or may not rotate, and if both video and audio are equally important, both can be rotated.

Further, it may not always be in line with the user's intention for the display device 100 to rotate unconditionally as the user moves, and intention analysis can be necessary. For such intention analysis, at least one of the current time, user's voice, content attributes, preset reservations, and whether the user has provided additional input can be referred. For example, if the user did not send a power-off command to the display device 100, but there was no input after moving to the side of the display device 100, this situation can be considered that there is no intention to use the display device 100 for at least a certain period of time. Therefore, if there is no user input for a certain period of time, the display device 100 can be controlled not to rotate and provide content contrary to the user's intention. Regarding intention analysis, a server provided by the manufacturer of the display device (100) or others can also be utilized.

In a similar manner, FIG. 16 can be related to controlling the operation of the display device 100 when an object, i.e., the user's height, changes. If a user initially watches content through the display device 100 while seated and then stands up, the angle formed between the user's eyes and the display 610 changes, which can interfere with the user's viewing experience.

Therefore, as shown in FIG. 16, the display device 100 can detect the user's eye level and adjust the angle between the display 610 and the lower case 520 accordingly. In this instance, depending on the degree of adjustment of the angle between the display 610 and the lower case 520, the area where the display 610 overlaps with the speaker in the upper case 510 can change. Thus, the display device 100 can determine whether to control the output of the speaker based on the difference in the overlap area and adjust the output of the speaker based on the determination result.

However, in this instance as well, a change in the user's height does not necessarily mean an intention to continue watching the content on the display 610 as described above, so the display device 100 can adjust the angle of the display 610 when there are additional inputs from the user indicating an intention to continue watching it.

Figure 17:
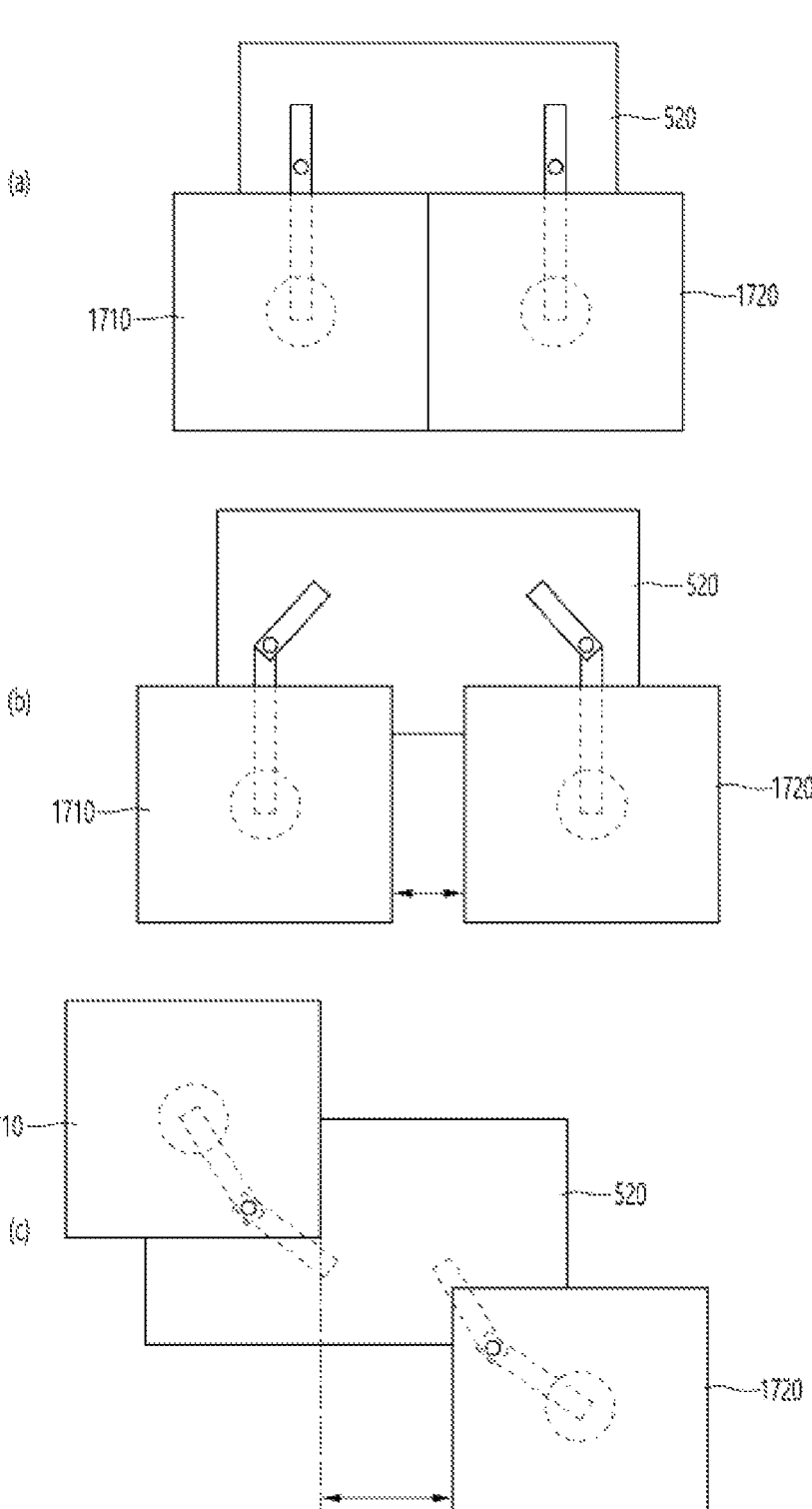
FIG. 17 is a diagram illustrating how a separation operation of a display is controlled according to an embodiment of the present disclosure.

Next, FIG. 17 is a diagram for explaining how a separation operation of a display is controlled according to an embodiment of the present disclosure. Referring to FIG. 17, the display can include a first display 1710 and a second display 1720. In FIG. 17(a), the first display 1710 and the second display 1720 can function as a single display by being in contact with each other.

Further, in FIGS. 17(b) and (c), the first display 1710 and the second display 1720 can function as two separate displays. As shown in FIG. 17(a), each display 1710 and 1720 can be separated from each other. For supporting the movement of each display 1710 and 1720, a foldable stand can be assigned to the displays, respectively. The structure between each display and the foldable stand can refer to the description in FIG. 7.

In FIG. 17(b), the first display 1710 and the second display 1720 can be shown separated and moved horizontally from each other. In addition, in FIG. 17(c), the first display 1710 and the second display 1720 can be shown separated and moved not only horizontally but also vertically. In FIGS. 17(b) and (c), a single user can use the desired displays 1710 and/or 1720 at desired locations to view different contents (or channels) like a multi-view mode, or multiple users can use them to view desired contents from their preferred locations.

In FIGS. 17(b) and (c), compared to FIG. 6(b) or (c), separation of the displays can relatively reduce interference or obstruction caused by the speaker's output, and can be controlled to be relatively less increase or decrease compared to FIG. 10 or 11 as described earlier.

Figure 18:
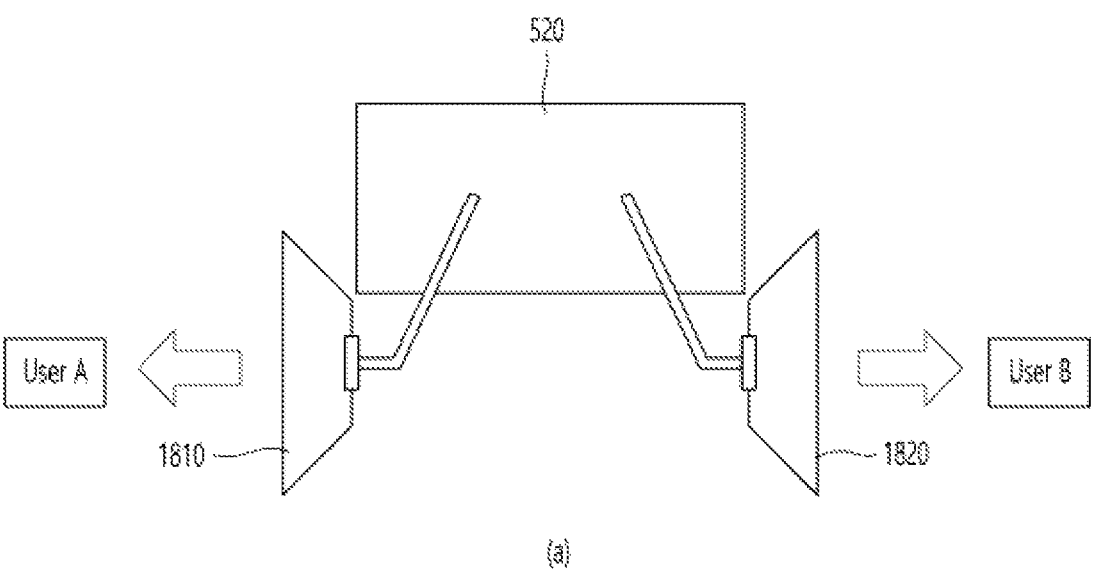
FIG. 18 is a diagram illustrating the operation of the display device including at least two displays.
Figure 18:
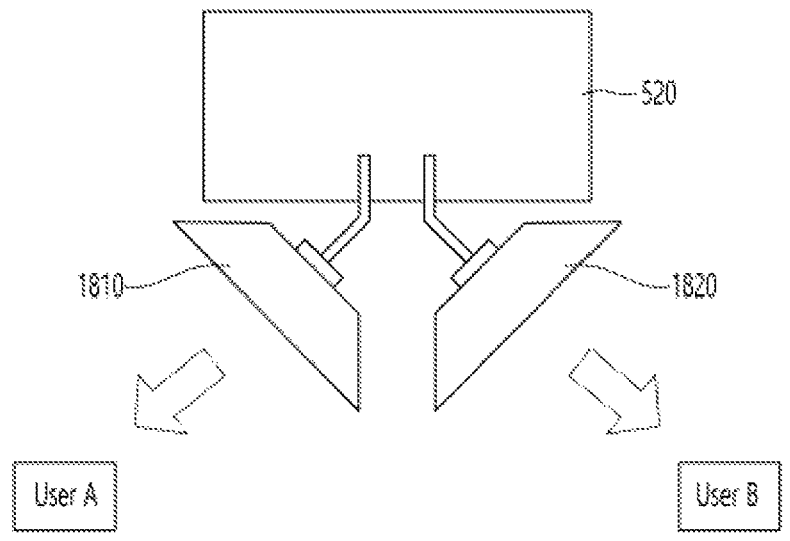

In addition, the FIG. 18 is a diagram for explaining the operation of the display device 100 including at least two displays. In FIG. 18, the display device 100, including two physically separated individual displays, i.e., two displays, is shown. Each display 1810 or 1820 can be individually controlled by the user. For this purpose, each display 1810 or 1820 can be provided with an individual mount for connecting an individual mechanism (e.g., foldable stand) to the lower case 520. A single foldable stand can be extracted from the lower case 520 to support each display 1810 or 1820 in a form where only the second stand portion is separated.

In FIG. 18(a), each separated display can be moved left and right by, for example, 90 degrees from the lower case 520 so that each user, i.e., user A and user B, can individually view content. In FIG. 18(b), each separated display can be horizontally moved by, for example, 45 degrees from the lower case 520, allowing each user, i.e., user A and user B, to view individual contents.

In FIGS. 18(a) and (b), the separated displays can view the same or different contents. In the former, audio settings can be uniformly set based on the relationship between each separated display and the upper case 510. Further, in the latter situation, it may be necessary to refer to the information of the provided contents through each display. That is, in the latter situation, if each user is watching different contents, the audio settings can differ depending on the type or attribute of the contents provided through each display.

In addition, the type or attribute of content can refer to the importance of audio. For example, for a music playback program, the importance of audio can be considered relatively high, while for content where video is more important, such as a gallery mode, the importance of audio can be considered relatively low. Therefore, if the first display 1810 provides a music program to user A, and the second display 1820 provides a gallery or drama to user B, the audio related to the music program provided through the first display 1810 can be output or controlled through the speakers provided in the upper case 510, and the content provided through the second display 1820 can be provided subtitles of the content.

Figure 19:
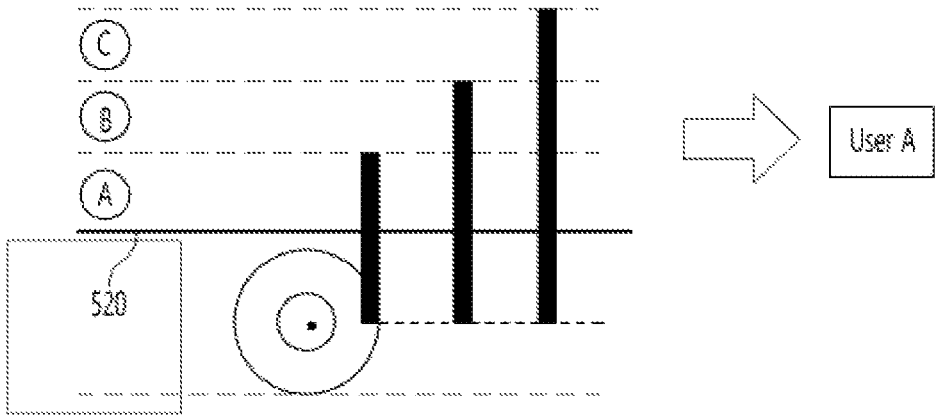
FIG. 19 is a diagram illustrating an operation when a rollable display is mounted on the display device 100.

Next, FIG. 19 is a diagram illustrating an operation when a rollable display is mounted on the display device 100. In FIG. 19, the display device 100 can include a rollable display provided inside the lower case 520, which can be exposed to a certain height above the upper part of the lower case 520 depending on the operational mode. In this instance, the operational mode of the display device 100 can be automatically determined based on at least one of the content type or kind, user settings, or manually determined according to user requests.

For example, when only short or summary information such as weather is displayed or when playing only music without a video, the importance of audio can be relatively low, so the content can be provided in mode A. Also, if both video and audio are being output and their importance is similar, the content can be provided in mode B.

Further, if both video and audio are being output but video is more important than audio, mode C can be provided by increasing the weight of the video. The mode C can be, for example, the second operational mode in FIG. 6(*b*) or the third operational mode in FIG. 6(*c*). Based on the content type, a single display mode (for example, mode C) can be operating, but if the content type is changed, the display device 100 can automatically switch the preset display mode from mode C to mode A or mode B, according to the type of the new content.

In FIG. 19, the operational modes were described as mode A through mode C for convenience of explanation. However, based on at least one of the content, user, and the importance of video and/or audio, the height of the rollable display that is exposed from the lower case 520 can be continuously adjusted or arbitrarily determined. Next, FIGS. 20 to 25 disclose other embodiments for controlling the audio output of the upper case 510.

Figure 20:
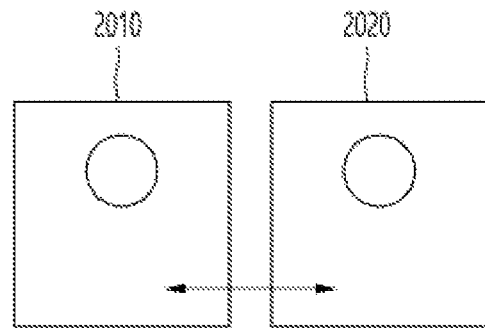
FIGS. 20 to 22 are diagrams illustrating the display device including a movable speaker.
Figure 20:
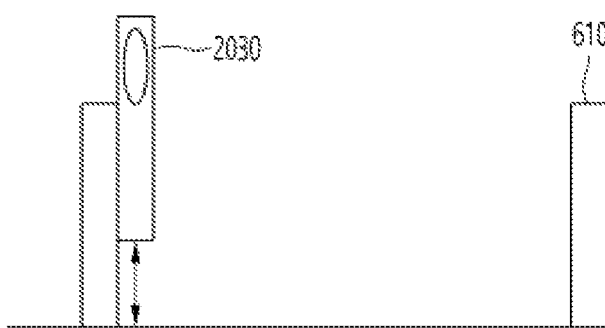
Figure 21:
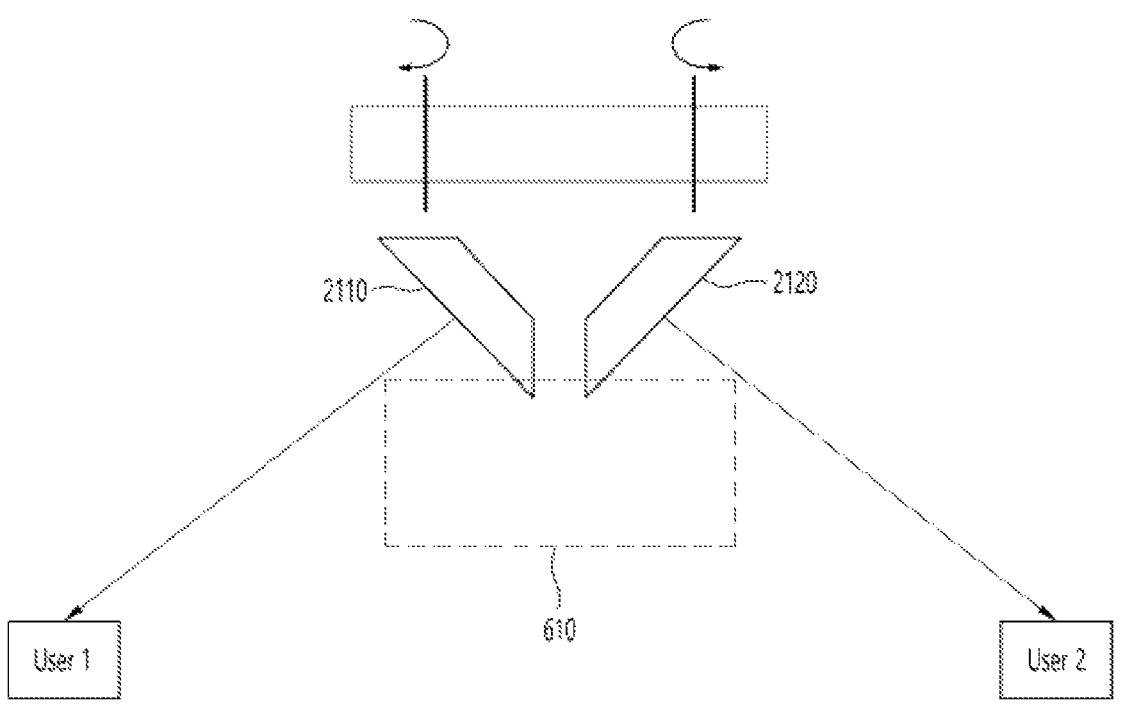
Figure 22:
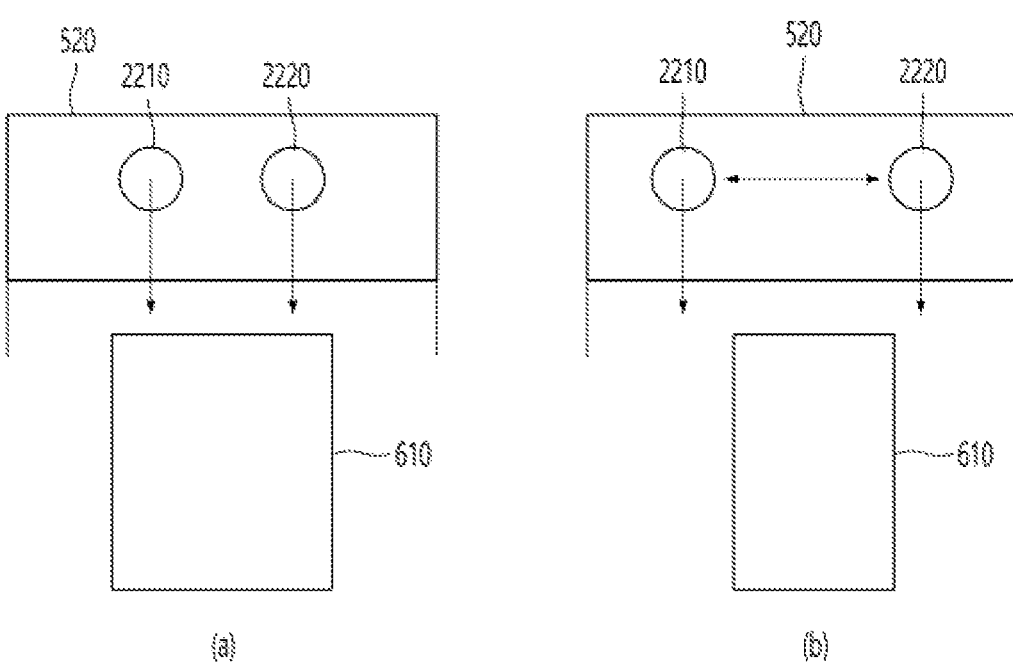

In particular, FIGS. 20 to 22 are diagrams illustrating the display device 100 including a movable speaker. First, FIG. 20(*a*) illustrates an example including two speakers 2010 and 2020 separated from the upper case 510 of the display device 100, and in FIG. 20(*b*), a speaker 2030 that can move up and down is included in the upper case 510 of the display device 100. The method as shown in FIGS. 20(*a*) and (*b*) can also be useful in the second operation mode (landscape mode) in FIG. 6(*b*) or the third operation mode (portrait mode) in FIG. 6(*c*).

Referring to FIG. 20(*a*), the first speaker 2010 and the second speaker 2020 can be both capable of horizontal movement. In this instance, as the speakers 2010 and 2020 can move left and right, particularly when the display device 100 is operating in the third operational mode as shown in FIG. 6(*c*), each speaker can move left and right to ensure that it does not interfere with the front of the display 610 in the direction of audio output, allowing the user to listen to the audio without any interference without the need for separate audio output control. Furthermore, the degree of left and right movement of each speaker can also be useful when operating in the second operational mode as in FIG. 6(*b*). Even if it is not possible to move the speakers sufficiently to prevent audio output interference from the display 610, which is located in front of the speakers, the output level of the speakers can be controlled to a relatively lower level compared to that in the second operational mode in FIG. 6(*b*), thereby causing less interference with the user's audio listening experience.

Further, in FIG. 20(*b*), the speaker 2030 can be capable of moving vertically. For example, if the speaker 2030 cannot move vertically, as in the second operational mode (i.e., landscape mode) in FIG. 6(*b*), audio output can be obstructed by the display 610 placed in front, and thus the audio can need to be controlled through EQ mode changes as mentioned above according to an embodiment of the present disclosure. However, as shown in FIG. 20(*b*), if the speaker 2030 is capable of moving vertically, the audio output may need to be controlled relatively little or not at all even if the display device 100 operates in the second operational mode as shown in FIG. 6(*b*).

In addition, by combining the left-right movement of the speaker as shown in FIG. 20(*a*) (including when the speaker can move horizontally even if it is not detachable) with the vertical movement of the speaker as shown in FIG. 20(*b*), the speaker can be moved to a position where the output is minimally obstructed by the display 610, even without physically separating the speakers, thereby minimizing audio interference for the user.

Next, referring to FIG. 21, the first speaker 2110 can be moved in any direction towards user 1, and the second speaker 2120 can be moved in any direction towards user 2. However, as indicated by the arrow in FIG. 21, even if the front-facing audio output direction can correspond to the front direction of the user 1, the second speaker 2120 can be positioned slightly further away from the front-facing display 610 than shown in FIG. 21.

In this instance, unlike the feature as shown in FIG. 6, at least two full-range speakers can be provided to each user's personalized position, thereby minimizing audio listening interference caused by the front-facing display 610. Different from the aforementioned FIGS. 20 and 21, even if the upper case 510 containing the speakers is not physically separated or moved, only the speaker portion can be moved horizontally or vertically as shown in FIG. 22.

In FIG. 22(*a*), the original position of the speaker is shown as in FIG. 6(*c*). In FIG. 22(*b*), even though the upper case 510 can remain in the same position according to the third operation mode, the speakers 2210 and 2220 can be moved horizontally to ensure that the user can listen to the audio without any problem, without requiring audio output control.

Figure 23:
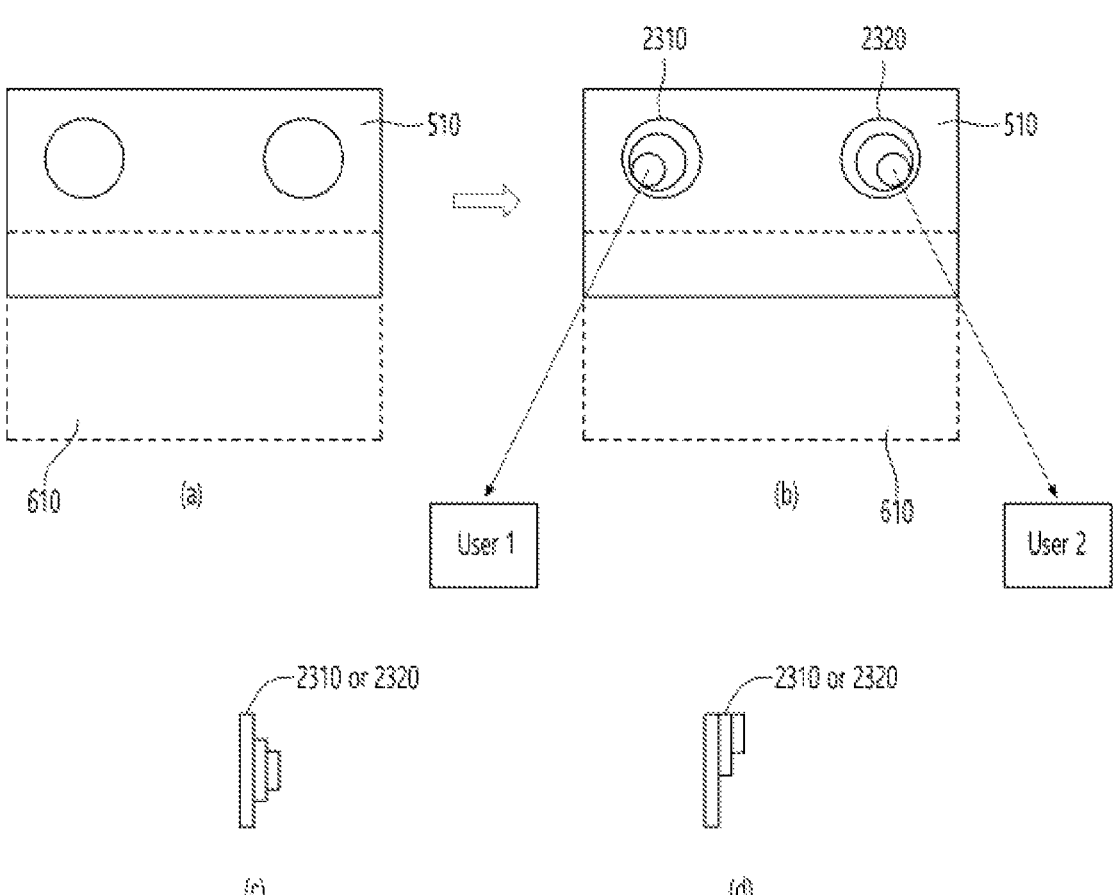
FIGS. 23 and 24 are diagrams illustrating the display device equipped with a speaker capable of output direction control.
Figure 24:
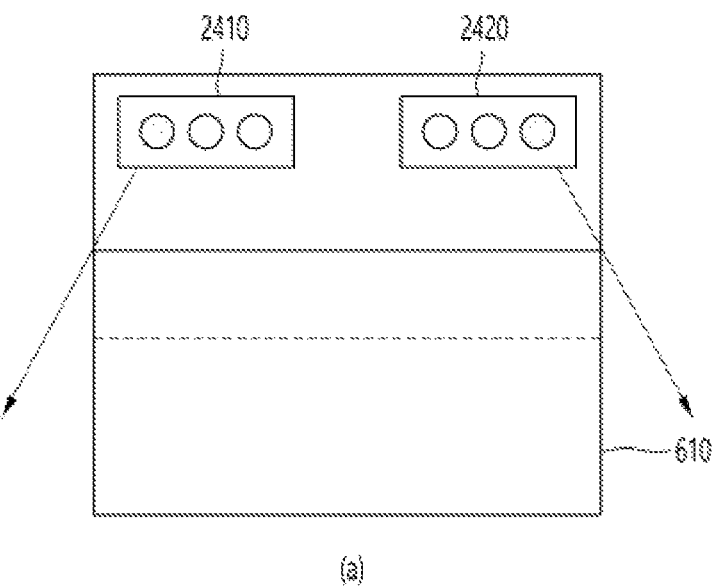
Figure 24:
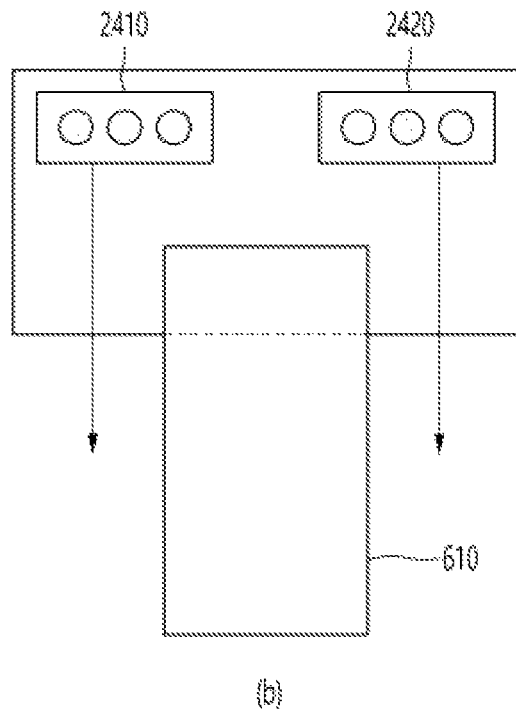

In FIGS. 23 and 24, it may be not required to physically move the upper speaker 510 or the speaker inside the upper case 510 in FIGS. 20 to 22. Further, in FIGS. 23 and 24, the audio output direction can be controlled, thereby achieving the same or similar effect as indicated in FIGS. 20 to 22.

In more detail, FIGS. 23 and 24 are diagrams illustrating the display device 100 equipped with a speaker capable of output direction control. First, in FIG. 23(*c*) or (*d*), even though the speakers 2310 and 2320 themselves are not physically moved horizontally or vertically, an array structure for the speaker having directionality can be implemented. Accordingly, the audio output direction at that position can be controlled and adjusted towards each user direction, for example, as shown in FIG. 23(*b*), allowing for control of the audio output direction without physically moving the speakers.

As indicated in FIG. 23, when at least one speaker 2310 and 2320 included in the lower case 520 can be implemented in an array form, the audio output direction can be controlled and adjusted in the second operation mode as in FIG. 6(*a*) or the third operation mode as in FIG. 6(*c*) by processing with digital signal processing (DSP). Further, unlike forming the speakers 2310 and 2320 in an array structure as shown in FIG. 23, in FIG. 24, multiple individual speakers

2410 and 2420 can be implemented in a horizontally arranged form in the upper case 510, lower case 520, or relative to the display 610. The type or properties of each individual speaker can be the same or different. For example, one of the individual speakers can be a full-range speaker, and another can be a tweeter speaker.

The display device 100 can individually control and select the output level of each speaker according to the second operational mode as shown in FIG. 24(*a*), or according to the third operational mode as shown in FIG. 24(*b*). For example, in the third operational mode as shown in FIG. 24(*b*), assuming that the audio output direction of each speaker 2410 and 2420 is towards the front, individual speakers that are partially obstructed can be deactivated while the remaining speakers is activated. For instance, at least one of the individual speakers included in each of the speakers 2410 and 2420 in FIG. 24 can have been implemented in an array form.

Figure 25:
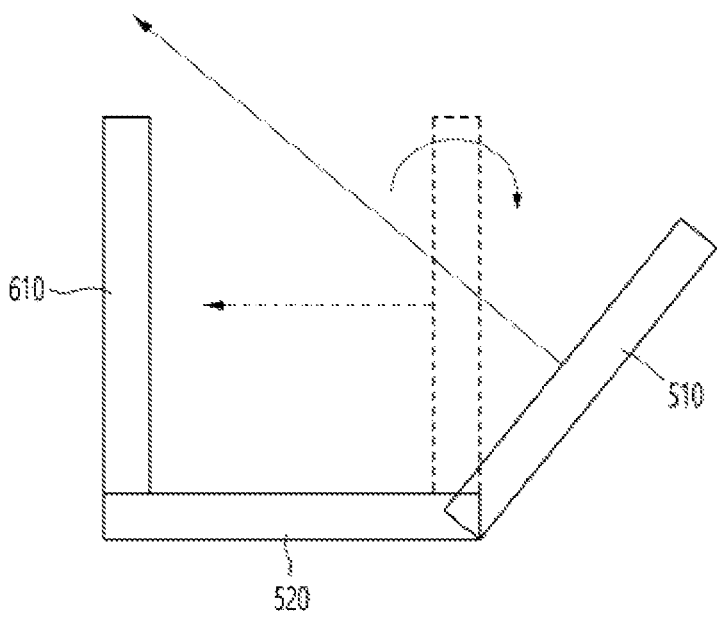
FIG. 25 is a diagram illustrating an operation of the display device in which an upper case equipped with a speaker is movable.

Next, FIG. 25 is a diagram illustrating an operation of the display device 100 in which an upper case equipped with a speaker is movable. In the above-described embodiments, when the display device 100 can move have mainly been described in conjunction with the lower case 520, in FIG. 25, the upper case 510 containing the speakers can also be moved to form an arbitrary angle with the side view of the display device 100, as shown in FIG. 25. In this instance, even if the speakers themselves do not move, the upper case 520 can be moved to form an arbitrary angle for the audio output direction. According to the embodiment of FIG. 25, movement of the speakers themselves or control of the audio output direction can also be combined. A mechanism similar to the one described for controlling the movement of the speaker or the upper case 520 can also be employed. Otherwise, the display device 100 can provide a guide screen to the user regarding the recommended position or angle of the speaker or the upper case 520 on the display 610.

Figure 26:
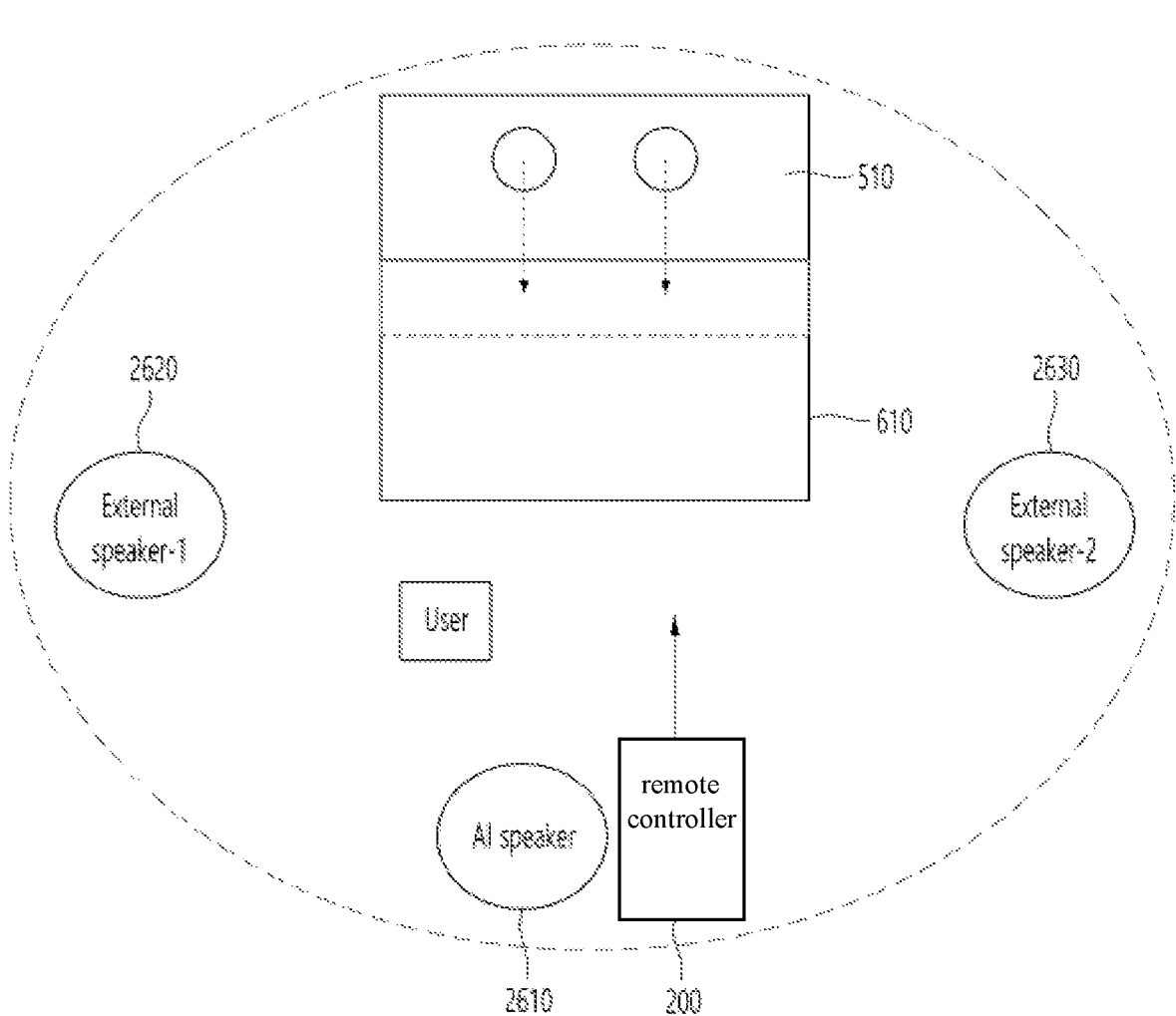
FIG. 26 is a diagram illustrating controlling audio output by linking the display device with a peripheral audio device according to a display operational mode.

Next, FIG. 26 is a diagram illustrating controlling audio output by linking the display device 100 with a peripheral audio device according to a display operational mode. As described above, even if users can control the display device 100 through touch on the display 610, they can also control the display device 100 through voice input via an AI speaker 2610 or through the remote control device 200.

If the display device 100 is operating in any of the operational modes as shown in FIGS. 6(*a*) to (*c*), and is connected to other audio devices in the surroundings, the aforementioned audio output control can differ. The surrounding audio devices 2620 and 2630 can be auxiliary speakers, such as woofer, and assuming they are audio devices registered in advance with the display device 100, the display device 100 can attempt to connect or link to each audio device 2620 and 2630 through, for example, Bluetooth.

The display device 100 can first determine an operational mode, determine a user's location, and then control audio output through a speaker. As shown in FIG. 26, when at least one or more auxiliary speakers 2620 and 2630 are interlocked to output audio, various information such as the type and performance of each auxiliary speaker 2620 and 2630 and the relationship with the user's location. In consideration of circumstances, output control for at least one speaker included in the upper case 510 of the display device 100 can be determined.

In this instance, the speaker provided in the upper case 510 of the display device 100 is turned off, and audio for the content currently being output is output through the display 610 using at least one of the external speakers 2620 and 2630. In this instance, even when all external speakers 2620 and 2630 are used, audio control content for each external speaker can be different.

According to one embodiment of the present disclosure, when the upper case 510 of the display device 100 is opened, the display device 100 immediately enters the first operational mode. Content can be output on the image. That is, the fixing means provided on the outer part of the lower case 520 can perform a kind of power trigger function of the display device 100.

In this instance, since the display device 100 may go against the user's intention, if there is no additional input or control by the user within a predetermined time, it is determined that the viewing of the corresponding content has been accepted, and audio data for the corresponding content is displayed. The display device 100 can provide a list of contents viewed immediately after the opening of the upper case 510 and output the selected contents immediately.

The display device 100 can provide recommended contents or a list according to a corresponding point in time based on the point in time when the upper case 510 is opened. The viewpoint can indicate, for example, a time zone (which can be defined as a season, weekday, weekend, morning, lunch, evening, etc.). The display device 100 can provide recommended content or a list based on the weather at the time when the upper case 510 is opened. In this instance, current and near-future weather of a corresponding area unit can be referred to as the weather based on location information such as global positioning system (GPS).

For example, the aforementioned recommended content can be determined by referring to content that is hot at the time, viewer ratings, and ranking of search words in a web browser. Alternatively, the recommended content can be determined by considering various information such as a user's schedule, SNS (Social Networking Service) information, interest level, previous viewing history, etc., by referring to user information that identifies a user or is registered.

Meanwhile, the foregoing information can be triggered by a specific input, gesture, or voice after the upper case is opened, not necessarily when the upper case is opened. Even if not specifically mentioned, the order of at least some of the operations disclosed in this disclosure can be performed simultaneously or in a different order from the previously described order, or some can be omitted/added.

According to the embodiment of the present disclosure, the above-described method can be implemented as a processor-readable code in a medium on which a program is recorded. Examples of media readable by the processor include ROM, RAM, CD-ROM, magnetic tape, floppy disk, optical data storage, and the like.

The display device described above is not limited to the configuration and method of the above-described embodiments, but the above embodiments can be configured by selectively combining all or part of each embodiment so that various modifications can be made.

What is claimed is:

1. A display device, comprising:
at least one speaker;
a moveable display configured to be moved from a first position to a second position, wherein the display has a first spatial physical relationship with the at least one speaker at the first position and has a second spatial physical relationship with the at least one speaker at the second position; and a processor configured to:

output audio from the at least one speaker, when the display is in the first position, receive an information signal indicating the display has been moved to the second position from the first position, and change the output of the audio from the at least one speaker based on the second spatial physical relationship, wherein a spatial physical relationship between the display and the at least one speaker includes an overlapped spatial physical relationship in which an output direction of audio output by the at least one speaker overlaps with the display and a distance between the display and the at least one speaker, and wherein the processor is configured to define an operational mode of the display based on the spatial physical relationship between the display and the at least one speaker.

2. The display device of claim 1, further comprising:

a movement mechanism connected to one end of the display and configured to support the display to move from the first position to the second position.

3. The display device of claim 2, wherein the movement mechanism includes a hinge.

4. The display device of claim 2, further comprising:

at least one sensor configured to sense a position of the display moved by the movement mechanism.

5. The display device of claim 4, wherein the at least one sensor is mounted on one end of the display or is integrated in the display.

6. The display device of claim 5, wherein the at least one sensor includes an accelerometer and a 6-axis gyro sensor.

7. The display device of claim 1, wherein the operational mode of the display includes:

a first operational mode in which an output direction of the audio from the at least one speaker does not overlap with the display;

a second operational mode in which the output direction of the audio from the at least one speaker partially overlaps with the display; and a third operational mode in which the output direction of the audio from the at least one speaker fully overlaps with the display.

8. The display device of claim 7, wherein the processor is further configured to:

set an output of the audio from the at least one speaker in the first operational mode as a reference output, and control the output of audio from the at least one speaker in the second operational mode and the third operational made based on the set reference output.

9. The display device of claim 7, wherein, when the display is operated in the second operational mode, the processor is further configured to:

reduce a first frequency band and increase a second frequency band of the set reference output.

10. The display device of claim 7, wherein, when the display is operated in the third operational mode, the processor is further configured to:

reduce a third frequency band and increase a fourth frequency band of the set reference output.

11. The display device of claim 7, wherein, when the display is operated in the third operational mode, the processor is further configured to:

reduce a fifth frequency band of an output from the at least one speaker operating in the second operational mode and increase a sixth frequency band.

12. The display device of claim 7, wherein the processor is further configured to:

control the output of audio from the at least one speaker according to a pre-mapped EQ mode based on the operational mode of the display.

13. The display device of claim 7, wherein the at least one speaker includes an array speakers, and wherein the processor is configured to change an output direction of the audio by controlling individual speakers included in the array of speakers based on the operational mode of the display.

14. A display device comprising:

a first case including at least one speaker;

a second case including a display with a sensor;

a movement mechanism connecting the display to the second case and configured to support a movement of the display from a first position to a second position; and a processor configured to:

change an output direction of audio output from the at least one speaker based on the movement of the display from the first position to the second position, wherein a spatial physical relationship between the display and the at least one speaker includes an overlapped spatial physical relationship in which an output direction of audio output by the at least one speaker overlaps with the display and a distance between the display and the at least one speaker, and wherein the processor is configured to define an operational mode of the display based on the spatial physical relationship between the display and the at least one speaker.

15. The display device of claim 14, wherein the first case is opened and tilted at a predetermined angle from the second case, and wherein the movement mechanism includes a foldable stand supporting vertical, horizontal, and rotational movements of the display.

16. The display device of claim 15, wherein the foldable stand is mounted into a groove formed in the second case.

17. The display device of claim 14, wherein the processor is further configured to:

output audio from the at least one speaker, when the display is in the first position, receive an information signal indicating the display has been moved to the second position from the first position, and change the output of the audio from the at least one speaker based on the second-spatial physical relationship.

18. The display device of claim 14, wherein the operational mode of the display includes:

a first operational mode in which the output direction of the audio from the at least one speaker does not overlap with the display;

a second operational mode in which the output direction of the audio from the at least one speaker partially overlaps with the display; and a third operational mode in which the output direction of the audio from the at least one speaker fully overlaps with the display.

* * * * *